(12) United States Patent
Shah et al.

(10) Patent No.: US 12,444,418 B1
(45) Date of Patent: Oct. 14, 2025

(54) DEVICE SELECTION FOR OUTPUTTING CONTENT

(71) Applicant: Amazon Technologies, Inc., Seattle, WA (US)

(72) Inventors: Janita Shah, Sunnyvale, CA (US); Ratika Anand, San Jose, CA (US); Rohit Bhattacharjee, Mill Creek, WA (US); Karthik Parameswaran, Sunnyvale, CA (US); Samir Shah, Pleasanton, CA (US); Prathyusha Nadella, Milpitas, CA (US)

( * ) Notice: Subject to any disclaimer, the term of this patent is extended or adjusted under 35 U.S.C. 154(b) by 214 days.

(21) Appl. No.: 18/461,343

(22) Filed: Sep. 5, 2023

(51) Int. Cl.
    *G10L 15/22* (2006.01)
(52) U.S. Cl.
    CPC ........ G10L 15/22 (2013.01); *G10L 2015/223* (2013.01)
(58) Field of Classification Search
    USPC ..................................... 704/1–504, 275, 270
    See application file for complete search history.

(56) References Cited

U.S. PATENT DOCUMENTS

| | | | |
|---|---|---|---|
| 5,245,694 | A | 9/1993 | Zwern |
| 6,577,179 | B2 | 6/2003 | Falconer |
| 6,795,808 | B1 | 9/2004 | Strubbe et al. |
| 7,643,894 | B2 | 1/2010 | Braithwaite et al. |
| 7,869,796 | B2 | 1/2011 | Lee et al. |
| 8,126,435 | B2 | 2/2012 | George |
| 8,190,680 | B2 | 5/2012 | Spilo et al. |
| 8,243,949 | B2 | 8/2012 | Bhow et al. |
| 8,515,460 | B2 | 8/2013 | Greenberg |
| 8,599,014 | B2 | 12/2013 | Prykari et al. |
| 8,644,675 | B2 | 2/2014 | McDermott et al. |
| 8,725,277 | B2 | 5/2014 | Braithwaite et al. |
| 8,738,723 | B1 | 5/2014 | Faaborg et al. |
| 8,842,967 | B2 | 9/2014 | McDermott et al. |
| 8,879,761 | B2 | 11/2014 | Johnson et al. |
| 8,898,568 | B2 | 11/2014 | Bull et al. |
| 9,049,305 | B2 | 6/2015 | Carney et al. |
| 9,087,520 | B1 | 7/2015 | Salvador |

(Continued)

OTHER PUBLICATIONS

International Search Report and Written Opinion mailed Jul. 3, 2017 for International Patent Application No. PCT/US2017/017308 filed on Feb. 10, 2017.

(Continued)

*Primary Examiner* — Marcus T Riley
(74) *Attorney, Agent, or Firm* — Pierce Atwood LLP

(57) ABSTRACT

Techniques for determining a device(s) to output content are described. A primary device may receive a user input. Skill component configuration data may be determined, where the skill component configuration data indicates at least one display capability for outputting visual content of the skill component. Based on the skill configuration data, it may be determined that a secondary device is usable to present the visual content of the skill component. The skill component may provide a response to the user input, where the response includes: (i) a first portion to be output using at least one speaker; and (ii) a second portion to be output using a display. The primary device may be used to present the first portion of the response as audio and the secondary device may be used to present the second portion of the response as displayed content.

20 Claims, 10 Drawing Sheets

(56) References Cited

U.S. PATENT DOCUMENTS

| | | | |
|---|---|---|---|
| 9,135,281 B2 | 9/2015 | Thomas | |
| 9,142,215 B2 | 9/2015 | Rosner et al. | |
| 9,191,914 B2 | 11/2015 | Kennedy et al. | |
| 9,271,111 B2 | 2/2016 | Blanksteen | |
| 9,318,108 B2 | 4/2016 | Gruber et al. | |
| 9,349,386 B2 | 5/2016 | Adams et al. | |
| 9,372,963 B2 | 6/2016 | Lau et al. | |
| 9,484,030 B1 | 11/2016 | Meaney et al. | |
| 9,571,645 B2 | 2/2017 | Quast et al. | |
| 9,584,935 B2 | 2/2017 | Starobin et al. | |
| 9,590,941 B1 | 3/2017 | Itoh et al. | |
| 9,602,309 B2 | 3/2017 | Connelly et al. | |
| 9,609,406 B2 | 3/2017 | Guo et al. | |
| 9,613,623 B2 | 4/2017 | Kang et al. | |
| 9,635,740 B2 | 4/2017 | Sun et al. | |
| 9,645,786 B2 | 5/2017 | Khaira et al. | |
| 9,654,645 B1 | 5/2017 | Kamat et al. | |
| 9,668,052 B2 | 5/2017 | Lombardi et al. | |
| 9,704,486 B2 | 7/2017 | Basye et al. | |
| 9,715,367 B2 | 7/2017 | Sheen | |
| 9,774,385 B2 | 9/2017 | Foxworthy et al. | |
| 9,774,979 B1 | 9/2017 | Morishita et al. | |
| 9,848,253 B2 | 12/2017 | Watanabe et al. | |
| 9,858,927 B2 | 1/2018 | Williams et al. | |
| 9,875,081 B2 | 1/2018 | Meyers et al. | |
| 9,875,477 B2 | 1/2018 | Glore | |
| 9,875,734 B2 | 1/2018 | Agrawal et al. | |
| 9,972,320 B2 | 5/2018 | Melendo Casado et al. | |
| 10,009,687 B2 | 6/2018 | Lee et al. | |
| 10,055,190 B2 | 8/2018 | Gundeti et al. | |
| 10,057,736 B2 | 8/2018 | Gruber et al. | |
| 10,074,371 B1 | 9/2018 | Wang et al. | |
| 10,095,470 B2 | 10/2018 | Lang et al. | |
| 10,140,274 B2 | 11/2018 | Bastide et al. | |
| 10,142,271 B2 | 11/2018 | Garbin et al. | |
| 10,157,607 B2 | 12/2018 | Hwang et al. | |
| 10,181,323 B2 | 1/2019 | Beckhardt et al. | |
| 10,187,855 B2 | 1/2019 | Xu et al. | |
| 10,251,008 B2 | 4/2019 | Baker et al. | |
| 10,251,020 B1 | 4/2019 | Swart | |
| 10,276,185 B1 | 4/2019 | Ma et al. | |
| 10,284,980 B1 | 5/2019 | Woo et al. | |
| 10,296,646 B2 | 5/2019 | Bhatt et al. | |
| 10,304,475 B1 | 5/2019 | Wang et al. | |
| 10,319,375 B2 | 6/2019 | Fritz et al. | |
| 10,331,166 B2 | 6/2019 | Dahl et al. | |
| 10,332,523 B2 | 6/2019 | Leong | |
| 10,341,717 B2 | 7/2019 | Adimatyam et al. | |
| 10,382,509 B2 | 8/2019 | Williams et al. | |
| 10,425,780 B1 | 9/2019 | Devaraj et al. | |
| 10,425,781 B1 | 9/2019 | Devaraj et al. | |
| 10,470,020 B2 | 11/2019 | Lockenour | |
| 10,475,450 B1 | 11/2019 | Wu et al. | |
| 10,499,224 B2 | 12/2019 | Griffin et al. | |
| 10,547,729 B2 | 1/2020 | Choi et al. | |
| 10,609,037 B2 | 3/2020 | Jackson et al. | |
| 10,616,165 B2 | 4/2020 | Ganesh et al. | |
| 10,616,272 B2 | 4/2020 | Chambers et al. | |
| 10,616,726 B1 | 4/2020 | Freeman et al. | |
| 10,621,980 B2 | 4/2020 | Kim | |
| 10,650,128 B2 | 5/2020 | Nowak et al. | |
| 10,665,244 B1 | 5/2020 | Gupta et al. | |
| 10,679,250 B2 | 6/2020 | Pattan et al. | |
| 10,721,356 B2 | 7/2020 | Segalis et al. | |
| 10,726,452 B2 | 7/2020 | Brown et al. | |
| 10,733,685 B1 | 8/2020 | Gailloux et al. | |
| 10,776,070 B2 | 9/2020 | Ohmura | |
| 10,783,883 B2 | 9/2020 | Mixter et al. | |
| 10,789,041 B2 | 9/2020 | Kim et al. | |
| 10,841,304 B2 | 11/2020 | Kim et al. | |
| 10,847,158 B2 | 11/2020 | Wu et al. | |
| 10,917,494 B2 | 2/2021 | Dukellis et al. | |
| 10,957,126 B2 | 3/2021 | Maltsev et al. | |
| 11,017,115 B1 | 5/2021 | Young et al. | |
| 11,051,139 B2 | 6/2021 | Devaraj et al. | |
| 11,064,339 B2 | 7/2021 | Hamre et al. | |
| 11,120,804 B2 | 9/2021 | Pascovici et al. | |
| 11,133,003 B2 | 9/2021 | Ni | |
| 11,140,116 B2 | 10/2021 | Laller | |
| 11,216,729 B2 | 1/2022 | Chien et al. | |
| 11,231,975 B2 | 1/2022 | Chalmers et al. | |
| 11,232,808 B2 | 1/2022 | Ma et al. | |
| 11,295,743 B1* | 4/2022 | Bumberger | G10L 15/02 |
| 11,322,150 B2 | 5/2022 | Nadig et al. | |
| 11,354,764 B2 | 6/2022 | Bucciarelli | |
| 11,368,579 B1 | 6/2022 | Palanivel | |
| 11,385,930 B2 | 7/2022 | Frost | |
| 11,393,461 B2 | 7/2022 | Ganong et al. | |
| 11,398,231 B2 | 7/2022 | Goodman | |
| 11,405,740 B1 | 8/2022 | Berol | |
| 11,455,998 B1 | 9/2022 | Nadig et al. | |
| 11,514,926 B2 | 11/2022 | Nandy et al. | |
| 11,516,340 B2 | 11/2022 | Iltus et al. | |
| 11,531,940 B2 | 12/2022 | Gupta et al. | |
| 11,558,336 B1 | 1/2023 | Sullivan et al. | |
| 11,568,368 B2 | 1/2023 | Bar-on | |
| 11,586,416 B2 | 2/2023 | Peng et al. | |
| 11,657,095 B1* | 5/2023 | Wu | G06F 16/90332 704/9 |
| 11,694,684 B1* | 7/2023 | Risley | G10L 15/02 704/231 |
| 11,705,108 B1* | 7/2023 | Radostev | G10L 15/22 704/260 |
| 11,741,965 B1* | 8/2023 | Opp | G10L 13/086 704/270 |
| 11,783,805 B1 | 10/2023 | Nadig et al. | |
| 11,977,816 B1* | 5/2024 | Sepasi Ahoei | G06F 40/134 |
| 11,996,081 B2* | 5/2024 | Radostev | G10L 15/083 |
| 12,080,291 B2* | 9/2024 | Bumberger | G10L 15/02 |
| 12,132,952 B1* | 10/2024 | Dhanapalan | H04N 21/44 |
| 12,169,663 B1* | 12/2024 | Nagisetty | G06F 3/165 |
| 12,204,866 B1* | 1/2025 | Atluri | G06F 40/35 |
| 12,211,497 B1* | 1/2025 | Nadig | G10L 15/1822 |
| 12,230,278 B1* | 2/2025 | Bao | G06F 3/14 |
| 12,267,286 B1* | 4/2025 | Dani | H04L 51/043 |
| 12,294,771 B1* | 5/2025 | Thavrani | H04N 21/4316 |
| 12,317,388 B1* | 5/2025 | Dhanapalan | H05B 47/155 |
| 2008/0101770 A1 | 5/2008 | Commons et al. | |
| 2008/0235018 A1 | 9/2008 | Eggen et al. | |
| 2010/0031299 A1 | 2/2010 | Harrang et al. | |
| 2010/0057470 A1 | 3/2010 | Silvera et al. | |
| 2011/0080289 A1 | 4/2011 | Minton | |
| 2011/0270517 A1 | 11/2011 | Benedetti | |
| 2012/0096018 A1 | 4/2012 | Metcalf | |
| 2014/0337424 A1 | 11/2014 | Lee et al. | |
| 2015/0095014 A1 | 4/2015 | Marimuthu | |
| 2015/0160817 A1 | 6/2015 | Hwang et al. | |
| 2015/0162006 A1 | 6/2015 | Kummer | |
| 2015/0193379 A1 | 7/2015 | Mehta | |
| 2016/0034249 A1 | 2/2016 | Lee et al. | |
| 2016/0094437 A1 | 3/2016 | On | |
| 2016/0379638 A1 | 12/2016 | Basye et al. | |
| 2018/0176885 A1 | 6/2018 | VanBlon et al. | |
| 2018/0367862 A1 | 12/2018 | Horii et al. | |
| 2018/0376526 A1 | 12/2018 | Duncan et al. | |
| 2020/0126560 A1 | 4/2020 | Ho et al. | |
| 2020/0154236 A1 | 5/2020 | Carbune et al. | |
| 2020/0184963 A1 | 6/2020 | Joseph et al. | |
| 2020/0185078 A1 | 6/2020 | Pauws et al. | |
| 2020/0211553 A1 | 7/2020 | Bohl et al. | |
| 2021/0118063 A1 | 4/2021 | Zhao et al. | |
| 2021/0209710 A1 | 7/2021 | Shetty et al. | |
| 2021/0335342 A1 | 10/2021 | Yuan et al. | |
| 2021/0377702 A1 | 12/2021 | Devaraj et al. | |
| 2021/0398550 A1 | 12/2021 | Nandy et al. | |
| 2022/0358921 A1* | 11/2022 | Bumberger | G10L 15/02 |
| 2024/0029708 A1* | 1/2024 | Radostev | G10L 15/22 |
| 2024/0046932 A1* | 2/2024 | Opp | G10L 15/005 |
| 2024/0220197 A1* | 7/2024 | Sepasi Ahoei | H04N 21/8106 |

(56) References Cited

U.S. PATENT DOCUMENTS

2024/0274122 A1* 8/2024 Wang .................. G10L 15/16
2024/0321261 A1* 9/2024 Radostev ............ G10L 15/1822

OTHER PUBLICATIONS

International Search Report and Written Opinion mailed Apr. 22, 2021 for International Patent Application No. PCT/US2021/012144 filed on Jan. 5, 2021.
International Search Report and Written Opinion mailed Oct. 12, 2021 for International Patent Application No. PCT/US2021/029590 filed on Apr. 28, 2021.
Invitation to Pay Additional Fees mailed on Aug. 18, 2021 for International Patent Application No. PCT/US2021/029590 filed on Apr. 28, 2021.
Definition from Techopedia—What is an Integrated Circuit (IC)? Retrieved on May 21, 2022 from https://www.techopedia.com/definition/2366/integrated-circuit-ic, (Last updated: Feb. 13, 2014), 1 page.

* cited by examiner

DEVICE SELECTION FOR OUTPUTTING CONTENT

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
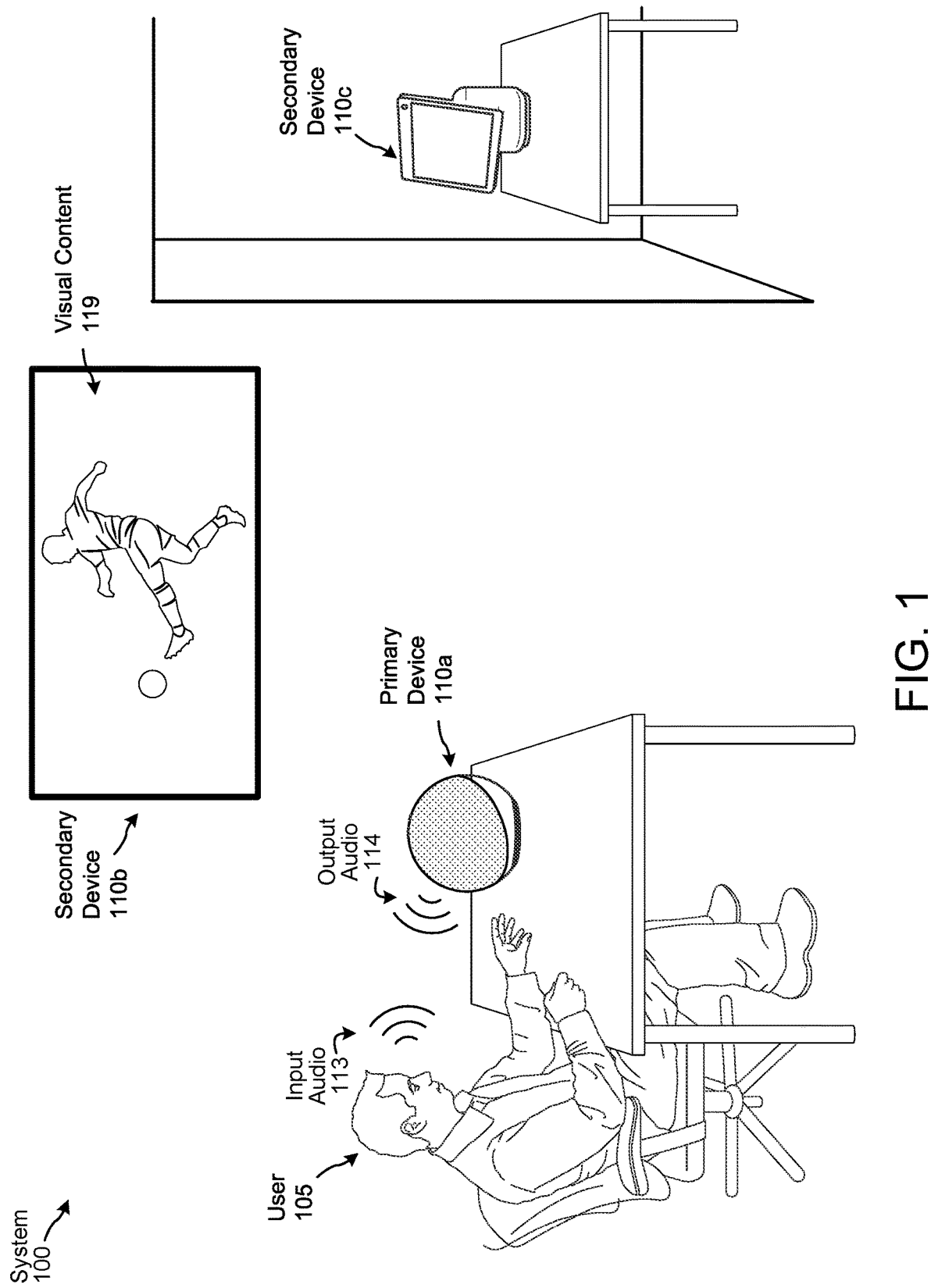
FIG. 1 illustrates an example scenario of a user receiving visual content from a secondary device in response to a user input, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content. ASR, NLU, TTS, and NLG may be used together as part of a speech-processing/virtual assistant system.

A device may output synthesized speech in response to a user input. For example, in response to the user input "how many calories are in an avocado," a device may output the calories in an avocado as synthesized speech. For further example, in response to the user input "what is the weather," a device may output today's weather as synthesized speech. For further example, in response to the user input "who was the first president of the United States," a device may output "George Washington" as synthesized speech. For further example, in response to the user input "what day is Thanksgiving this year," a device may output the date of the Thanksgiving holiday for the current year as synthesized speech. For further example, in response to the user input "play jazz music," a device may output a jazz music recording.

In instances where the device that captures the user input includes a display, the device may also or alternatively present visual content responsive to the user input. For example, in response to the user input "how many calories are in an avocado," the device may display an image of an avocado with text corresponding to the number of calories. For further example, in response to the user input "what is the weather," the device may display an image representing the type of weather (e.g., sunny, cloudy, rainy, etc.) along with text of a high temperature to be expected.

As used herein, "content" refers to synthesized speech, displayed text, an image(s), a video, a displayed graphical user interface (GUI) element, or the like that is output to and/or perceivable by a user.

The present disclosure provides techniques for, among other things, presenting audio and visual outputs responsive to a user input, where the audio output can be presented using the primary device that captured the user input and the visual output is presented using a secondary device including a display. For example, the primary device that captures the user input may not have a display or may have a display that is less preferred for presenting a response to the current input. For example, some output content may be best displayed by a device having a better resolution for properly presenting the visual content. In such an instance, the device may be considered to have less than optimal capabilities to display the visual content. In another instance, the device that captures the user input may have a display that is currently displaying content (e.g., a movie) having a higher priority, thereby preventing the device from being the best available to be used to present the visual content responsive to the user input. The teachings of the present disclosure enable, among other things, determination of the current preferred output device(s) and commands for causing the determined secondary device(s) (e.g., with the best display for the output) to be used to output content responsive to the user input.

A skill may be identified that is configured to generate the audio and visual outputs responsive to the user input. Skill configuration data for the skill may provide criteria for displaying visual output of the skill. One or more candidate secondary devices may be identified based on the one or more candidate secondary devices being associated with a user and/or group profile of the user and/or with which the primary device is associated.

The candidate secondary devices may be filtered to identify one or more thereof that can be utilized for displaying visual output of the skill. For example, if the user interacts with a primary device located in the user's home, then a device located at the user's office would be filtered, or removed, from the potential secondary devices. The candidate secondary devices may be filtered based on factors such as locality (e.g., premises corresponding to the primary device), status (e.g., online, offline, "do not disturb," etc.), and device capabilities corresponding to the skill configuration data. After the candidate secondary devices are filtered, the remaining secondary devices may be ranked for selecting a singular secondary device for outputting visual content. In some embodiments, the secondary devices may be ranked based on proximity/distance from the primary device and/or the correspondence of device capabilities with the criteria of the skill configuration data, among others. Information identifying the determined secondary device to output visual content may be provided to a skill configured to generate the audio and visual outputs responsive to the user input.

As used herein, a "skill" refers to software, that may be placed on a machine or a virtual machine (i.e., software that may be launched in a virtual instance when called), configured to process data representing a user input and perform one or more actions in response thereto. In some instances, a skill may process NLU output data to perform one or more actions responsive to a user input represented by the NLU output data. What is described herein as a skill may be referred to using different terms, such as a processing component, an application, a bot, or the like.

In addition, the present disclosure provides techniques for outputting supplemental content using a device including a display. As used herein, "supplemental content" refers to content that is not responsive to any particular user input but which may still be useful to a user. The supplemental content may be output sometime during or at the end of a dialog.

As used herein, a "dialog" refers to an exchange of related user inputs and system-generated responses. A dialog may be goal-oriented, meaning the dialog is directed to the performance of a specific action (e.g., figuring out what music the system should play). A user input and performance of a corresponding action (i.e., a system-generated response) may be referred to as a dialog "turn." A dialog identifier may be associated with multiple related turns corresponding to consecutive related user inputs and system outputs. Each turn may be associated with a respective turn identifier. One user input may be considered related to a subsequent user input, thereby causing a single dialog identifier to be associated with both user inputs. A first user input may be considered related to a second user input based on, for example, a length of time between receipt of the first and second user inputs, a length of time between performance of a system-generated response to the first user input and receipt of the second user input, the substances of the first and second user inputs, and/or the substances of the second user input and the system-generated response to the first user input.

Further, non-natural language inputs (e.g., image data, gestures, button presses, etc.) may relate to a particular dialog depending on the context of the inputs. For example, a user may open a dialog with a system to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

A system of the present disclosure may output visual supplemental content to a user using a secondary device that is within a proximity of the user. In the context of outputting visual supplemental content, one or more candidate secondary devices may be identified based on the one or more candidate secondary devices being associated with a user and/or group profile of the user and/or with which the primary device is associated. A singular secondary device for outputting visual supplemental content may be selected from the candidate secondary device(s) based on the location and capabilities of the candidate secondary device(s), such as by ranking the candidate secondary device(s).

In an instance, one or more supplemental content providers may be queried for visual supplemental content corresponding to the capabilities of the secondary device (e.g., visual supplemental content capable of being output using a resolution and/or color depth of the secondary device's display). In another instance, the one or more supplemental content providers may be generally queried for visual supplemental content, and any received visual supplemental content may be filtered based on the capabilities of the secondary device. Consequently, the secondary device may be used to present visual supplemental content capable of being presented using capabilities of the secondary device's display.

Teachings of the present disclosure provide, among other things, improved user experiences by presenting both audio and visual content in response to a user input, as well as visual supplemental content that may be useful to the user.

A first aspect of the present disclosure relates to a computer-implemented method including (and a system configured to) receiving, from a first device, input audio data including a spoken natural language user input associated with a user profile; processing the input audio data to determine NLU output data indicating an intent of the spoken natural language user input; determining a skill component configured to generate a response to the spoken natural language user input based on the NLU output data; determining skill configuration data associated with the skill component, the skill configuration data indicating at least one display capability for outputting first visual content of the skill component; determining a plurality of devices associated with the user profile, the plurality of devices comprising a second device and a third device; determining first device context data for the second device, the first device context data indicating a first display capability and a first location of the second device; determining second device context data for the third device, the second device context data indicating a second display capability and a second location of the third device; determining, based on the at least one display capability indicated in the skill configuration data, the first device context data, and the second device context data, that the second device is usable to present the first visual content of the skill component;

sending the NLU output data to the skill component; based on determining the second device is usable to present the first visual content of the skill component, sending an indication of the first display capability of the second device to the skill component; receiving, from the skill component and in response to sending the NLU output data and the indication: a first portion of the response to the spoken natural language user input, wherein the first portion of the response is to be output as audio; and a second portion of the response to the spoken natural language user input, wherein the second portion of the response is to be output using a display; causing the first device to present the audio corresponding to the first portion of the response; and causing the second device to present the first visual content corresponding to the second portion of the response.

In some embodiments of the first aspect, the computer-implement method further includes (and the system is further configured to) determining a dialog, including the spoken natural language user input, has ended; after determining the dialog has ended, determining supplemental content that is related to the dialog, the supplemental content including second visual content; and causing the second device to present the second visual content.

In some embodiments of the first aspect, the computer-implement method further includes (and the system is further configured to) after determining the dialog has ended, determining: the first device context data; the second device context data; and based on the first device context data and the second device context data, that the second device is usable to present second visual content included in the supplemental content.

In some embodiments of the first aspect, the computer-implement method further includes (and the system is further configured to) determining the first device context data after receiving the input audio data; processing the input audio data to further determine the first location is indicated in the spoken natural language user input; generating third device context data corresponding to the first device context data updated to indicate the first location is indicated in the spoken natural language user input; and based on the third device context data instead of the first device context data, determining the second device is usable to present the first visual content of the skill component.

A second aspect of the present disclosure relates to a computer-implemented method including (and a system configured to) receiving, from a first device, first input data representing a first user input; processing the first input data to determine a first intent of the first user input; determining a first skill component configured to generate a first response to the first user input based on the first intent; determining first skill configuration data associated with the first skill component, the first skill configuration data indicating at least one display capability for outputting first visual content of the first skill component; determining, based on the first skill configuration data associated with the first skill component, a second device usable to present the first visual content of the first skill component; sending the first intent to the first skill component; receiving, from the first skill component and in response to sending the first intent: a first portion of the first response to be output using at least one speaker; and a second portion of the first response to be output using a display; causing the first device to present the first portion of the first response; and causing the second device to present the second portion of the first response.

In some embodiments of the second aspect, the computer-implement method further includes (and the system is further configured to) determining supplemental content corresponding to the first user input is to be output, the supplemental content including second visual content; and causing the second device to present the second visual content.

In some embodiments of the second aspect, the computer-implement method further includes (and the system is further configured to) determining configuration data associated with a provider of the supplemental content, the configuration data indicating at least one display capability for outputting the second visual content; and determining, based on the configuration data associated with the provider of the supplemental content, that the second device is usable to present the second visual content of the supplemental content.

In some embodiments of the second aspect, the computer-implement method further includes (and the system is further configured to) after receiving the first input data, determining first device context data corresponding to the second device, the first device context data indicating a first location of the second device; processing the first input data to further determine the first location is indicated in the first user input; generating second device context data corresponding to the first device context data updated to indicate the first location is indicated in the first user input; and based on the second device context data instead of the first device context data, determining the second device usable to present the first visual content of the first skill component.

In some embodiments of the second aspect, the computer-implement method further includes (and the system is further configured to) after determining the second device, sending an indication of the second device to the first skill component.

In some embodiments of the second aspect, determining the second device is to be used to present visual content responsive to the first user input comprises one or more of: determining the second device is within a same room as the first device; determining a display capability of the second device satisfies a criterion; determining the second device is not associated with a do not disturb status; and determining the second device is associated with an online status.

In some embodiments of the second aspect, the computer-implement method further includes (and the system is further configured to) receiving, from the first device, second input data representing a second user input; processing the second input data to determine a second intent of the second user input; determining a second skill component configured to generate a second response to the second user input based on the second intent; determining second skill configuration data associated with the second skill component, the second skill configuration data indicating: at least one display capability for outputting second visual content of the second skill component; and at least one audio capability for outputting audio of the second skill component; determining, based on the second skill configuration data associated with the second skill component, that the second device is usable to present the second visual content and the audio of the second skill component; sending the second intent to the second skill component; receiving, from the second skill component and in response to sending the second intent: a first portion of the second response to be output using at least one speaker; and a second portion of the second response to be output using a display; causing the second device to present the first portion of the second response; and causing the second device to present the second portion of the second response.

In some embodiments of the second aspect, the computer implemented method further includes (and the system is further configured to) receiving, from the first device, second input data representing a second user input; processing the second input data to determine a second intent of the second user input; determining a second skill component configured to generate a second response to the second user input based on the second intent; determining second skill configuration data associated with the second skill component, the second skill configuration data indicating: at least one display capability for outputting second visual content of the second skill component; and at least one audio capability for outputting audio of the second skill component; determining, based on the second skill configuration data associated with the second skill component, that the second device is usable to present the second visual content of the second skill component; determining, based on the second skill configuration data associated with the second skill component, a third device usable to present audio output of the second skill component; sending the second intent to the second skill component; receiving, from the second skill component and in response to sending the second intent: a first portion of the second response to be output using at least one speaker; and a second portion of the second response to be output using a display; causing the third device to present the first portion of the second response; and causing the second device to present the second portion of the second response.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates an example scenario of a user 105 being presented with visual content using a secondary device located within a proximity of the user 105, according to embodiments of the present disclosure. As illustrated in FIG. 1, the user 105 may speak input audio 113, such as a command or request, to a primary device 110a. As described in reference to FIGS. 2A and 2B below, a system 200 may be configured to generate a response to the input audio 113 and the primary device 110a may output an audible response (e.g., output audio 114) via a speaker(s) on the primary device 110a.

The system 200 may determine visual content 119 responsive to the input audio 113. In such situations, the system 200 may determine one or more devices associated with the user 105 (e.g., associated with a user or group profile of the user 105) and capable of presenting the visual content. For example, as illustrated in FIG. 1, two secondary devices (e.g., a secondary device 110b and secondary device 110c may be associated with the user 105 and include displays for presenting the visual content. As shown in FIG. 1, the primary device 110a and the secondary device 110b are in the same room of a building as the user 105, and the secondary device 110c is in another room of the building. As such, the secondary device 110b may be considered to be within proximity of the primary device 110a, but the secondary device 110c may be considered to not be within proximity of the primary device 110a.

In an example scenario, the user 105 may direct a question at the primary device 110a (e.g., input audio 113), such as "Who won the game?" The system 200 may determine a response including the output audio 114 of "The Wildcats won the game" along with the output visual content 119, which may be an image or video of the game. The system 200 may determine that the primary device 110a, which received the input audio 113, does not have the capability to display visual content 119. Thus, the system 200 may determine whether one or more other devices are associated with the user 105 and have display capabilities. In the example of FIG. 1, this determination may result in the system 200 identifying at least the secondary device 110b and the secondary device 110c. The system 200 may then determine whether any of the identified secondary devices include displays. In the example of FIG. 1, this determination may result in the system 200 identifying at least the secondary device 110b and the secondary device 110c. The system 200 may determine whether any of the identified secondary devices that include displays are within a proximity of the user 105 and/or the primary device 110a (e.g., located in a same room). In the example of FIG. 1, the system 200 may determine the secondary device 110b is in within proximity the user 105 and/or the primary device 110a, and may determine the secondary device 110c is not within proximity of the user 105 and/or the primary device 110a. Based on the foregoing, the system 200 may cause the visual content 119 to be presented using the secondary device 110b.

Figure 2A:
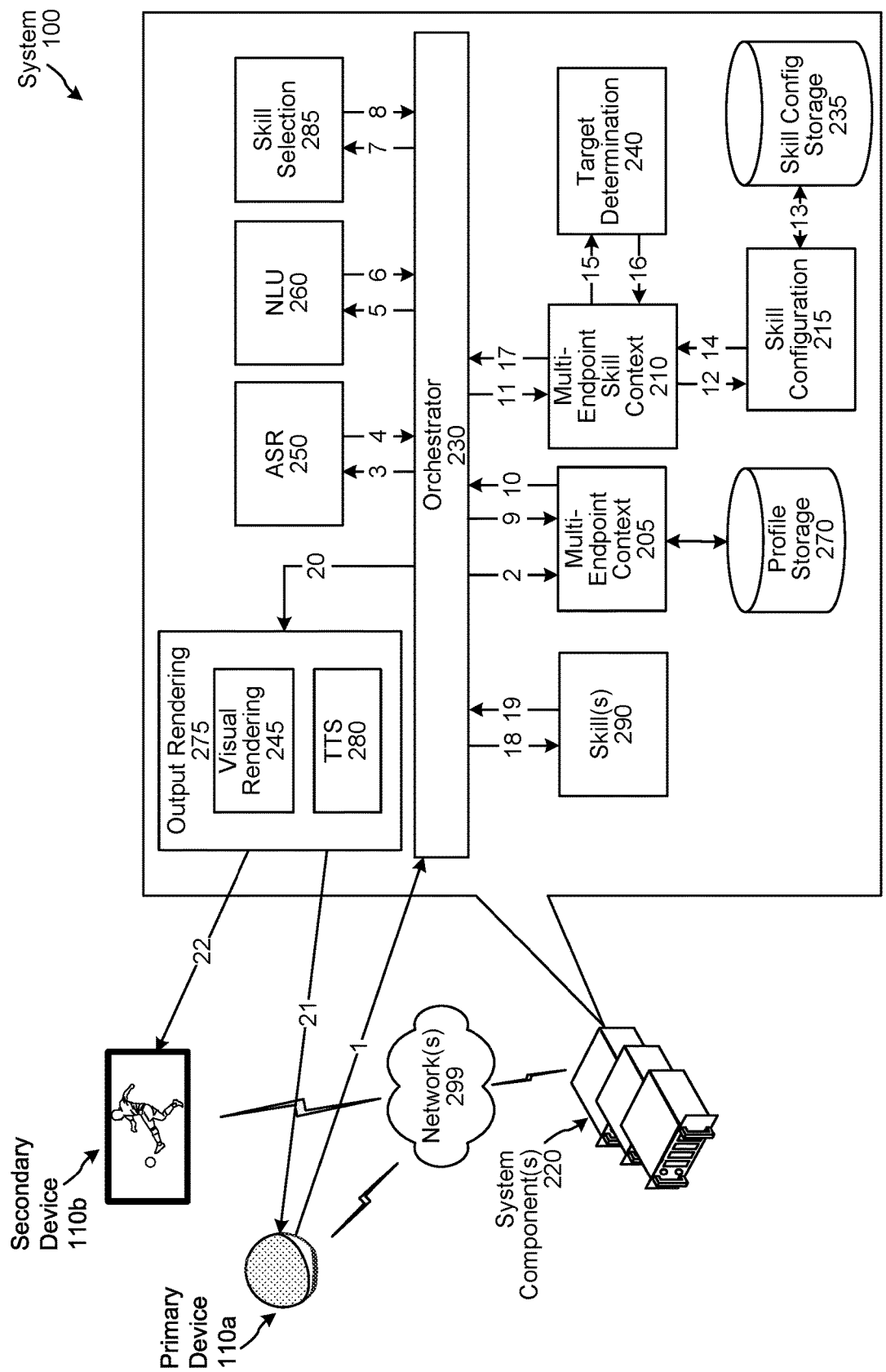
FIG. 2A is a conceptual diagram illustrating output of audio content using a primary device and visual content using a secondary device, according to embodiments of the present disclosure.
Figure 2B:
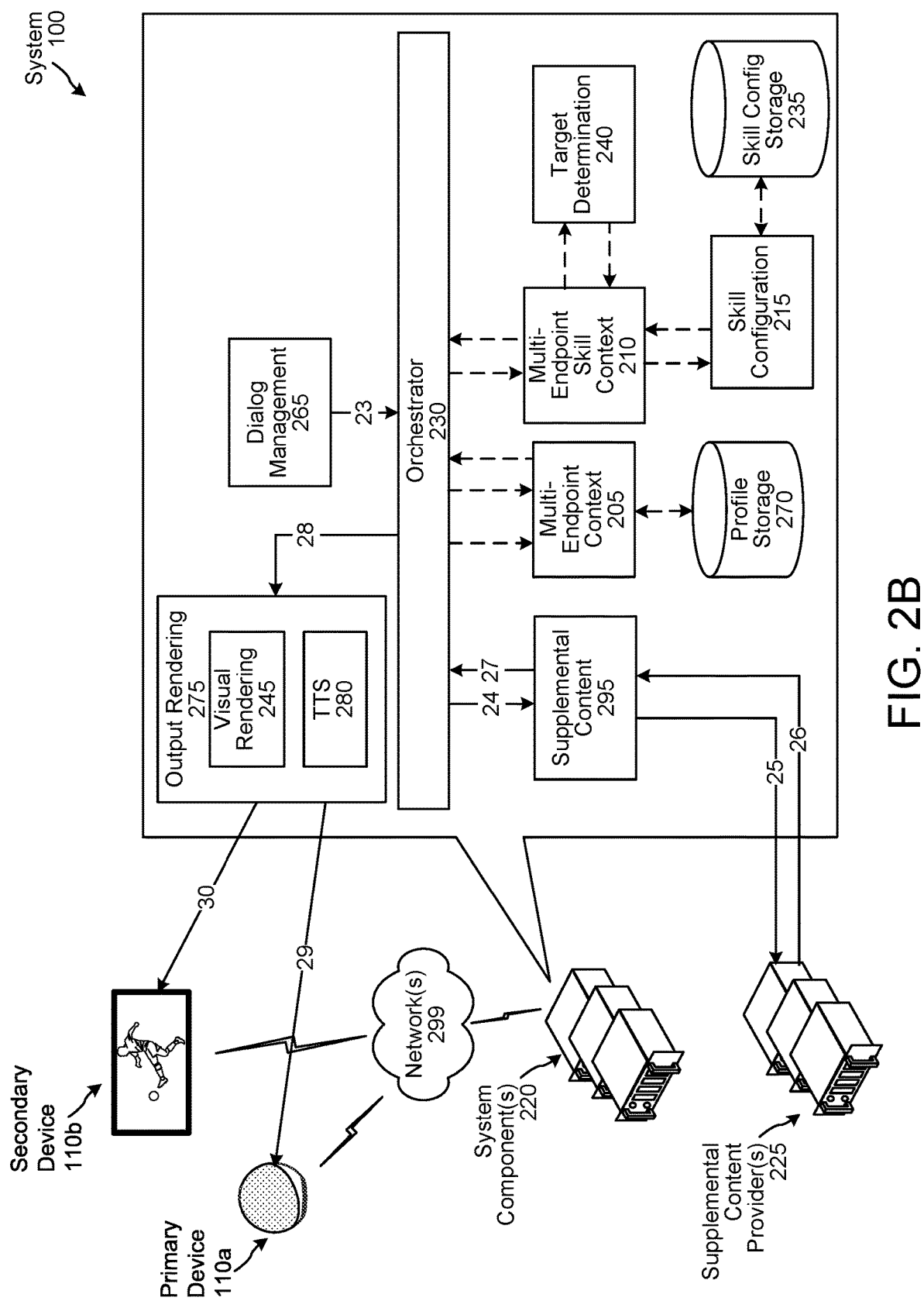
FIG. 2B is a conceptual diagram illustrating output of visual supplemental content using a secondary device, according to embodiments of the present disclosure.
Figure 2C:
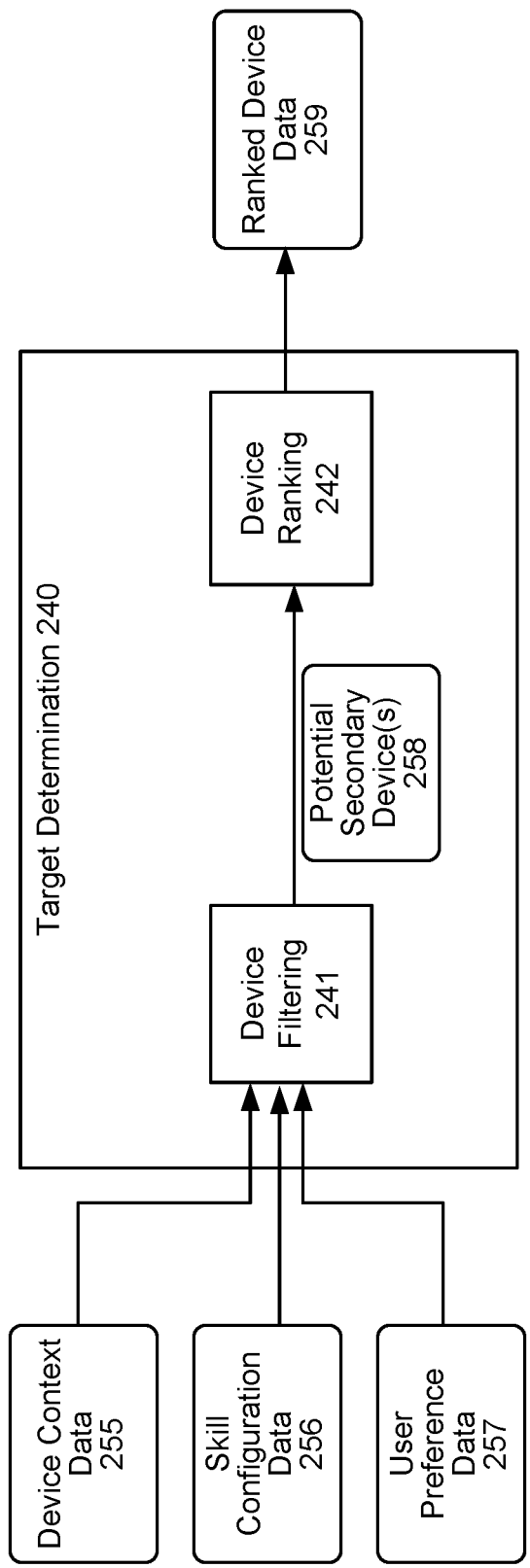
FIG. 2C is a conceptual diagram illustrating determination of a secondary device, according to embodiments of the present disclosure.

FIGS. 2A, 2B, and 2C are conceptual diagrams illustrating the system 200 configured to output audio content using the primary device 110a and visual content using the secondary device 110b, according to embodiments of the present disclosure. Although the figures and discussion of the present disclosure illustrate certain processes in a particular order, the processes described may be performed in a different order (as well as certain processes removed or added) without departing from the present disclosure.

FIG. 2A illustrates the system 200 configured to generate a response to a user input where the response is bifurcated between the primary device 110a (e.g., the user input receiving device) and the secondary device 110b (e.g., a device with visual output capabilities). As illustrated, the system 200 may include the primary device 110a, the secondary device 110b (with both devices local to the user 105), and a system component(s) 220 in communication across a network(s) 299. The network(s) 299 may include the Internet and/or any other wide- or local-area network, and may include wired, wireless, and/or cellular network hardware.

The user 105 may speak an input, and the primary device 110a may receive the input audio 113 representing the spoken user input. For example, the user 105 may say "what is the weather" or "book me a plane ticket to Seattle." In other examples, the user 105 may provide another type of input (e.g., selection of a button, selection of one or more displayed graphical interface elements, perform a gesture, etc.). Further, the user 105 may provide a typed natural language input to the primary device 110a via a physical or virtual keyboard. The primary device 110a may send (step 1) input data to the system component(s) 220 for processing. In examples where the user input is a spoken natural language input, the input data may be audio data. In other examples, the input data may be text data (i.e., represents a selected button or graphical user interface element(s), or a typed input) or image data (i.e., corresponding to a performed gesture).

The system component(s) 220 may include various components to facilitate processing of the user input. For example, the system may include an orchestrator component 230, an automatic speech recognition (ASR) component 250, a natural language understanding (NLU) component 260, a skill selection component 285, a multi-endpoint context component 205, a skill component(s) 290, an output rendering component 275, a multi-endpoint skill context component 210, a skill configuration component 215, a target determination component 240, a skill configuration storage 235, and a profile storage 270. The output rendering component 275 may include a TTS component 280 and a visual rendering component 245.

The orchestrator component 230 may receive (step 1) the input data from the primary device 110a. The input data may include information about the primary device 110a. For example, the input data may include at least a device identifier corresponding to the primary device 110a. Upon receiving the input data from the primary device 110a, the orchestrator component 230 may send (step 2) a device context request to the multi-endpoint context component 205. The device context request causes the multi-endpoint context component 205 to request device information of one or more devices associated with the user 105 and/or the primary device 110a. The device context request may include a dialog identifier corresponding to a dialog including the instant user input, a user profile identifier corresponding to the user 105, a group profile identifier corresponding to a group that includes the user 105, and/or the device identifier corresponding to the primary device 110a. In the situation where the multi-endpoint context component 205 receives the dialog identifier, the MDCC may query a dialog history storage (not illustrated) of the system component(s) 220 for a user profile identifier associated with the dialog identifier, a group profile identifier associated with the dialog identifier, and/or a device identifier of the device that captured the instant user input and associated with the dialog identifier.

The multi-endpoint context component 205 may determine, based on the received identifier(s) (e.g., dialog identifier, user profile identifier, group profile identifier, and/or device identifier) one or more devices associated with the user 105 and/or the primary device 110a. In the situation where the multi-endpoint context component 205 receives or determines (i.e., from the dialog history storage) the user profile identifier, the multi-endpoint context component 205 may request device context data associated with the user profile identifier in the profile storage 270. In the situation where the multi-endpoint context component 205 receives or determines (i.e., from the dialog history storage) the group profile identifier, the multi-endpoint context component 205 may request device context data associated with the group profile identifier in the profile storage 270. In the situation where the multi-endpoint context component 205 receives or determines (i.e., from the dialog history storage) the device identifier of the primary device 110a, the multi-endpoint context component 205 may request device context data associated with the device identifier in the profile storage 270. The device context data may include one or more device identifiers corresponding to one or more devices associated with the user 105 and/or the primary device 110a, where each of the one or more device identifiers in the device context data is associated with data representing one or more output components (e.g., display, speaker(s), etc.) of the corresponding device, capabilities (e.g., resolution, color depth, display size, speaker quality, etc.) of the one or more output components, device location (e.g., global positioning system (GPS) coordinates and/or relative location within a building (e.g., living room, dining room, etc.)) of the corresponding device, a currently-implemented software version of the corresponding device, and/or other defining characteristics of the corresponding device.

In the case that the input data is or includes audio data, the orchestrator component 230 may send (step 3) the input audio data to the ASR component 250. In some embodiments, step 3 may occur at least partially in parallel with step 2. The ASR component 250 may process the input audio data to determine ASR output data including one or more ASR hypotheses, where each ASR hypothesis is a different transcript of the words included in the spoken user input. Details of how the ASR component 250 may process the input audio data are described herein below with respect to FIG. 4.

The ASR component 250 may send (step 4) the ASR output data to the orchestrator component 230. The orchestrator component 230 may send (step 5) the ASR output data to the NLU component 260. The NLU component 260 performs NLU processing to determine NLU output data including one or more NLU hypotheses, where a NLU hypothesis includes an intent and optionally one or more entity types and one or more corresponding entity values. For example, an NLU hypothesis may include a "location" entity type and a corresponding entity value of "bedroom," "living room," "vacation house," etc. Details of how the NLU components 260 may be configured are described herein below with respect to FIG. 4.

The NLU component 260 sends (step 6) the NLU output data to the orchestrator component 230. The orchestrator component 230 may send the NLU output data to multiple components of the system component(s) 220. For example, as illustrated in FIG. 2A, the orchestrator component 230 may send (step 7) the NLU output data to the skill selection component 285 and may send (step 9) the NLU output data to the multi-endpoint context component 205. The orchestrator component 230 may send the NLU output data to the skill selection component 285 and the multi-endpoint context component 205 such that the skill selection component 285 and the multi-endpoint context component 205 are able to process at least partially in parallel.

The skill selection component 285 may receive (step 7) and process the NLU output data, and optionally other data, to determine one or more skill components capable of processing the NLU output data to respond to the user input. For example, if the user input is "when is the next [artist name] concert," the skill selection component 285 may determine one or more concert listing skill components. The skill selection component 285 may generate skill request data including a skill component identifier, corresponding to a skill component that is to process the NLU output data to determine a response to the user input, and the NLU output data. Details of how the skill selection component 285 may be configured are described herein below with respect to FIG. 4. The skill selection component 285 may send (step 8) the skill request data to the orchestrator component 230.

As discussed above, in response to the device context request of step 2 the multi-endpoint context component 205 may determine device context data for one or more devices that are associated with the user 105 and/or the primary device 110a. The multi-endpoint context component 205 may receive (step 9) the NLU output data and, in response thereto, may update the already-determined device context data to indicate which if any of the one or more devices that may correspond to the user input as represented in the NLU output data. For example, if the NLU output data includes an entity value of "living room device" and the device context data includes a device location of "living room," the device context data for the device located in the living room may be updated by the multi-endpoint context component 205 to indicate the device corresponds to the user input. Additionally, the multi-endpoint context component 205 may update the device context data to indicate the device of the device context data that corresponds to the entity indicated in the NLU output data. In some situations, the device context data may be determined using the device identifier of the primary device 110a as a starting point. In such situations, the device context data may include device context data for devices associated with the primary device 110a, and may or may not include device context data corresponding to the primary device 110a itself.

The multi-endpoint context component 205 may send (step 10) the device context data or the updated device context data (as in some instances the multi-endpoint context component 205 may not receive the NLU output data and may not update the device context data, or the multi-endpoint context component 205 may receive the NLU output data but not update the device context data. In some embodiments, step 9 may be omitted and the orchestrator component 230 may not send the NLU output data to the multi-endpoint context component 205. In such embodiments, the multi-endpoint context component 205 may send non-updated device context data to the orchestrator component 230. In some instances, the multi-endpoint context component 205 may receive the NLU output data at step 9, but the multi-endpoint context component 205 may not update the device context data (i.e., due to the NLU output data not including an entity value corresponding to a device location represented in the device context data). In such instances, the multi-endpoint context component 205 may send non-updated device context data to the orchestrator component 230. In instances where the multi-endpoint context component 205 receives the NLU output data and updates the device context data based thereon, the multi-endpoint context component 205 may send the updated device context data to the orchestrator component 230.

The orchestrator component 230 may send (step 11) the skill request data corresponding to the highest ranked skill component 290, as received from the skill selection component 285, and the (updated) device context data to a multi-endpoint skill context component 210. In some embodiments, the orchestrator component 230 may not send the skill request data, but rather may send just the skill identifier of the skill component 290 to process with respect to the instant user input. The multi-endpoint skill context component 210 may send (step 12) the skill identifier (of the skill request data) to a skill configuration component 215 having access to configuration data for skill components of the system 200. In response to receiving the skill identifier, the skill configuration component 215 may retrieve (step 13), from a skill configuration storage 235, skill configuration data associated with the skill identifier. The skill configuration data may indicate the device capabilities or device configuration preferred and/or required for outputting content provided by the corresponding skill component. For example, the skill configuration data may indicate whether rendering of a skill component's output content requires a speaker (and optionally a speaker quality), a display (and optionally one or more qualities of the display), or both. The skill configuration component 215 may send (step 14) the skill configuration data corresponding to the skill identifier to the multi-endpoint skill context component 210. The multi-endpoint skill context component 210 may send (step 15) the skill configuration data and the (updated) device context data, as well as the skill request data and/or user preference data in some embodiments, to a target determination component 240, as illustrated in FIG. 2C.

For example, the target determination component 240 may filter and/or rank the one or more devices, included in the (updated) device context data, to determine the secondary device 110b. The target determination component 240 may determine the secondary device 110b based on the capabilities of the device(s) and their correspondence to device configuration information indicated in the skill configuration data. Additionally, the target determination component 240 may determine the secondary device 110b based on the capabilities of the primary device 110a. For example, if the primary device 110a includes a display, the target determination component 240 may determine the secondary device 110b to be a device having a "better" (e.g., higher resolution and/or larger, etc.) display than the primary device 110a. The target determination component 240 may be configured to determine a device, or n-best list of devices, where each device from the device context data is associated with a corresponding confidence value (e.g., score) representing the target determination component's assessment as to whether the corresponding device is capable of outputting content based on (i.e., in accordance with) the skill configuration data.

Referring to FIG. 2C, the target determination component 240 may determine the secondary device 110b, from among the one or more devices included in the (updated) device context data, to be used to present visual output content of the skill component 290. The target determination component 240 may receive the (updated) device context data 255, the skill configuration data 256, and user preference data 257 from the multi-endpoint skill context component 210. In some embodiments, the skill request data may be input to the target determination component 240.

In some embodiments, a device filtering component 241 of the target determination component 240 may filter devices represented in the (updated) device context data 255 received from the multi-endpoint skill context component 210. In some embodiments, the device filtering component 241 may filter based on topology, capabilities, device settings, and/or device state. The device filtering component 241 may filter the devices to exclude devices that are not within a proximity (e.g., in the same room as, associated with a same location name as, within a threshold distance of, etc.) of the primary device 110a. In other words, the device filtering component 241 may determine potential secondary device(s) 258 based at least in part on the devices of the device context data 255 being within a proximity of the primary device 110a. In some embodiments, the device filtering component 241 may filter the devices to exclude devices that are not within a same premises (e.g., building) as the primary device 110a. In other words, the device filtering component 241 may determine potential secondary device(s) 258 based at least in part on the devices of the device context data 255 being within a same premises as the primary device 110a.

The device filtering component 241 may additionally or alternatively filter the devices to exclude devices that do not include displays. In other words, the device filtering component 241 may determine the secondary device 110b based at least in part on the secondary device 110b including a display. The device filtering component 241 may additionally or alternatively filter the devices to exclude devices having displays that do not satisfy one or more criteria (e.g., resolution, size, etc.) for the display as indicated in the skill configuration data 256. In other words, the device filtering component 241 may determine the potential secondary device(s) 258 based at least in part on the secondary device 110b having a display that satisfies at least one criteria of the skill configuration data.

The device filtering component 241 may additionally or alternatively filter the devices to exclude devices that are presently in use or performing a function. In other words, the device filtering component 241 may determine potential secondary device(s) 258 based at least in part on a device from the device context data 255 not presently outputting video. The device filtering component 241 may additionally or alternatively filter the devices to exclude devices having a present status of "do not disturb" or the like. In other words, the device filtering component 241 may determine potential secondary device(s) 258 based at least in part on a device from the device context data 255 not being associated with a do not disturb status. The device filtering component 241 may additionally or alternatively filter the devices to exclude devices having a present status of "offline", meaning the device is presently not able to send data to and receive data from the system component(s) 220 via the network(s) 299. In other words, the device filtering component 241 may determine potential secondary device(s) 258 based at least in part on the device of the device context data 255 being associated with an "online" status, meaning the potential secondary device 258 is presently able to at least receive data from (and optionally send data to) the system component(s) 220 via the network(s) 299.

After filtering by the device filtering component 241 or without performing any filtering, a device ranking component 242 of the target determination component 240 may rank two or more devices of the potential secondary device(s) 258 (if there are more one potential secondary device) based on one or more criteria. For example, the device ranking component 242 may rank the potential secondary device(s) 258 based on whether a device is presently outputting audio including synthesized speech, whether a device is presently outputting non-synthesized speech audio (e.g., music or some other long form audio output), and/or whether a device is presently displaying content (e.g., non-home screen content, such as content output in response to a user input). The device ranking component 242 may rank the potential secondary device(s) 258 based on the proximity and/or distance from the primary device 110a. For example, the device filtering component 241 may determine two or more potential secondary device(s) 258 are located in the same room as the primary device 110a, and the device ranking component 242 may rank the potential secondary device(s) 258 based on their distances from the primary device 110a to identify the device closest to the primary device 110a. The device ranking component 242 may rank the potential secondary device(s) 258 based on criteria of the skill configuration data 256. For example, the skill configuration data 256 may indicate a preferred screen resolution and/or screen size, thus the device ranking component 242 may rank devices higher that more closely correspond to the preferred screen resolution. The device ranking component 242 may rank the potential secondary device(s) 258 based on the user preference data 257, such as an indication of a user preferred device. For example, the user preference data 257 may indicate the user prefers to view content on a particular device (e.g., Smart TV), thus the device ranking component 242 may rank the particular device(s) indicated in the user preference data 257 higher than other device(s).

The device ranking component 242 may determine ranked device data 259 by ranking the potential secondary device(s) 258 based on one or more criteria, such as described above. In some instances, if the potential secondary device(s) 258 includes a single device, then the device ranking component 242 may identify the same single device in the ranked device data 259.

The target determination component 240 may send (step 16) the ranked device data, or n-best list of devices, to the multi-endpoint skill context component 210. In some embodiments, the target determination component 240 may only send the device context data of the determined secondary device 110b to the multi-endpoint skill context component 210. In situations where the target determination component 240 sends a ranked list of devices or n-best list of devices to the multi-endpoint skill context component 210, the multi-endpoint skill context component 210 may use the received data to determine the secondary device 110b to be used to present visual content provided by the skill component 290. The secondary device 110b may have one or more device capabilities different from the primary device 110a, such as a screen for displaying content. In some embodiments, the multi-endpoint skill context component 210 may determine the secondary device 110b based in part on one or more user preferences. The user profile data, obtained from the profile storage 270, may include one or more user preferences for how a user prefers content to be presented (i.e., a user may prefer visual content if they have a hearing impairment, may prefer visual content be displayed using one display device over another display device, etc.). The multi-endpoint skill context component 210 may send (step 17) a device identifier, corresponding to the secondary device 110b, and the skill request data to the orchestrator component 230. In some embodiments, the multi-endpoint skill context component 210 may send the device context data of the secondary device 110b to the orchestrator component 230.

The orchestrator component 230 may send (step 18) the skill request data to the skill component 290. Along with the skill request data, the orchestrator component 230 may send, to the skill component 290 at step 18, an indication that a display is configured to output visual content provided by the skill component 290 and/or the device context data of the secondary device 110b. The skill component 290 may process the received NLU output data of the skill request data to determine skill output data. The skill output data may include text or tokenized data and/or visual data (e.g., image data, video data, and/or text data to be displayed) or a link to visual data responsive to the user input received at step 1. For example, in the case of the user input "when is the next [artist name] concert," the text or tokenized data may be "[artist name]'s next concert is [date]" and the visual data may be or include image data including a list of the next five concert dates for "[artist name]". The skill component 290 may send (step 19) the skill output data to the orchestrator component 230.

The orchestrator component 230 may send (step 20) the skill output data to an output rendering component 275. Additionally, the orchestrator component 230 may provide the output rendering component with the device identifiers of the primary device 110a and the secondary device 110b, as well as data indicating the primary device identifier is to be used to output audio and the secondary device identifier is to be used to output visual content. The output rendering component 275 may provide the text or tokenized data of the skill output data to a TTS component 280 and the visual data of the skill output data to a visual rendering component 245. The TTS component 280 may generate, based on the text or tokenized data, output audio data including synthesized speech, as described herein below with respect to FIG. 4. The output rendering component 275 may send (step 21) the output audio data to the primary device 110a for output by a speaker(s) of the primary device 110a. The visual rendering component 245 may render output visual data of the visual data corresponding to the screen and display capabilities of the secondary device 110b. The output rendering component 275 may send (step 22) the output visual data to the secondary device 110b for display.

The foregoing description of FIG. 2A describes the secondary device 110b being determined prior to the skill component 290 being called to process, and the skill component 290 being provided with information related to the secondary device 110b so the skill component 290 may consider same when generating visual data for output. In some embodiments, the skill component 290 may be called to process prior to the secondary device 110b being determined. In such embodiments, the skill component 290 may receive the NLU output data and generate the skill output data based on the NLU output data but without consideration of which device will output the visual data of the skill output data. At least partially in parallel to or after the skill component 290 processes, the multi-endpoint skill context component 210, the target determination component 240, and the skill configuration component 215 may process to determine the secondary device 110b to be used to output the visual data of the skill output data.

The foregoing description of FIG. 2A describes a single skill component 290 providing skill output data that includes both audio content and visual content. In some embodiments, multiple skill components 290 may provide skill output data corresponding to a single user input. In an instance, a first skill component 290a may provide audio content and a second skill component 290b may provide visual content. The output rendering component 275 may receive the audio content provided by the first skill component 290a and the visual content provided by the second skill component 290b and perform similar functionality as described above in steps 20-22. In some embodiments, the first skill component 290a may cause the second skill component 290b to process to provide the visual content. For example, NLU output data of the user input "play a song by [artist]" may be sent to a music skill component 290a. In response to receiving the NLU output data, the music skill component 290a may provide audio content (e.g. a song performed by [artist]) responsive to the user input. The music skill component 290a may also cause a concert ticket skill component 290b to retrieve concert date data for [artist] and provide the concert date data as visual content. The primary device 110a may receive the audio content provided by the music skill component 290a and the secondary device 110b may receive the visual content provided by the concert ticket skill component 290b, as similarly described above in steps 21 and 22.

In some embodiments, rather than the first skill component 290a causing the second skill component 290a to process, the system 100 may cause the primary device 110a to present the audio content responsive to the user input. Upon completing the audio output, the primary device 110a may notify the system component(s) 220 of such, at which point the second skill component 290 may be caused to process to provide the visual content responsive to the user input. For example, the primary device 110a may publish, to an event tracking component (e.g., an event bus), an event indicating the audio output has completed. The second skill component 290b may subscribe to the event tracking component to receive notification of such event types (e.g., a concert ticket skill component may subscribe to the event tracking component to receive notification when a device has completed output of a song). In response to the second skill component 290b receiving the event published by the primary device 110a, the second skill component 290b may process to determine the visual content responsive to the user input. The second skill component 290b may provide visual content for output by the secondary device 110b, similar to steps 20 and 22 described above.

The description of FIG. 2A notes the visual content, or output visual data, being sent to the secondary device 110b for display. In some embodiments, the primary device 110a may include a display and the output rendering component 275 may send the output visual data to both the primary device 110a and the secondary device 110b for display. In other words, the visual content may be mirrored across both the primary device 110a and the secondary device 110b. In other instances, the visual content may be output at least partially in parallel by the primary device 110a and the secondary device 110b. That is, output of the visual content by the primary device 110a and the secondary device 110b may be, but need not be, directly correlated. Similarly, the target determination component 240 may identify multiple secondary devices to simultaneously display the visual content. As described above, the user profile data, obtained from the profile storage 270, may include one or more user preferences for how a user prefers content to be presented. In an instance, a user preference may indicate that the user prefers visual content to be presented on multiple devices 110. In some instances, the multiple devices determined to be used to present the visual content may be multiple secondary devices (e.g., devices 110b and 110c illustrated in FIG. 1).

FIG. 2B illustrates the system 200 configured to generate and output supplemental content using the secondary device 110b. As illustrated, the system 200 may include the primary device 110a and the secondary device 110b, system component(s) 220, a supplemental content component 295, and a supplemental content provider(s) 225 in communication across the network(s) 299. However, the present disclosure envisions embodiments in which one or more content providers 225 are implemented by the system component(s) 220 and/or a device 110.

As used herein, a "supplemental content provider" refers to a computing system or component configured to send supplemental content to the supplemental content component 295. In some instances, a supplemental content provider may be a skill component 290.

At some point during a dialog session, that includes the user input discussed with respect to FIG. 2A, a dialog management component 265, of the system component(s) 220, may determine the user 105 should be presented with supplemental content. The dialog management component 265 may determine supplemental content should be output during or at the end of the dialog. In some embodiments, once the output rendering component 275 causes the response to a user input of the dialog to be output and the dialog has ended, the output rendering component (or another component of the system component(s) 220) may send data to the dialog management component 265 indicate the dialog has ended. In response to receiving this data, the dialog management component 265 may determine supplemental content should be output. The dialog management component 265 may send (step 23) a request (or command) to the orchestrator component 230 to invoke the supplemental content component 295. Such request (or command) may include the dialog identifier of the dialog that is ongoing or ended.

The orchestrator component 230 in turn sends (step 24) a request to generate supplemental content to the supplemental content component 295. The request may include at least the NLU output data for the most recent or last user input of the dialog and device data, such as the device identifier and device context data, corresponding to the secondary device 110b. In instances where the multi-endpoint skill context component 210 and the target determination component 240 process at some point during the dialog as described above with respect to FIG. 2A, the orchestrator component 230 may send, to the supplemental content component 295, the device data (e.g., device identifier and device context data) for the secondary device 110b as previously determined during the dialog. In some instances, the multi-endpoint skill context component 210 and the target determination component 240 may not process at some point during the dialog. In such instances, in response to receiving the request (or command) at step 23 in FIG. 2B the orchestrator component may cause the multi-endpoint context component 205 to determine device context data as described herein above with respect to FIG. 2A, and may cause the multi-endpoint skill context component 210 and the target determination component 240 to process as described herein above with respect to FIG. 2A to determine the secondary device 110b.

Figure 3:
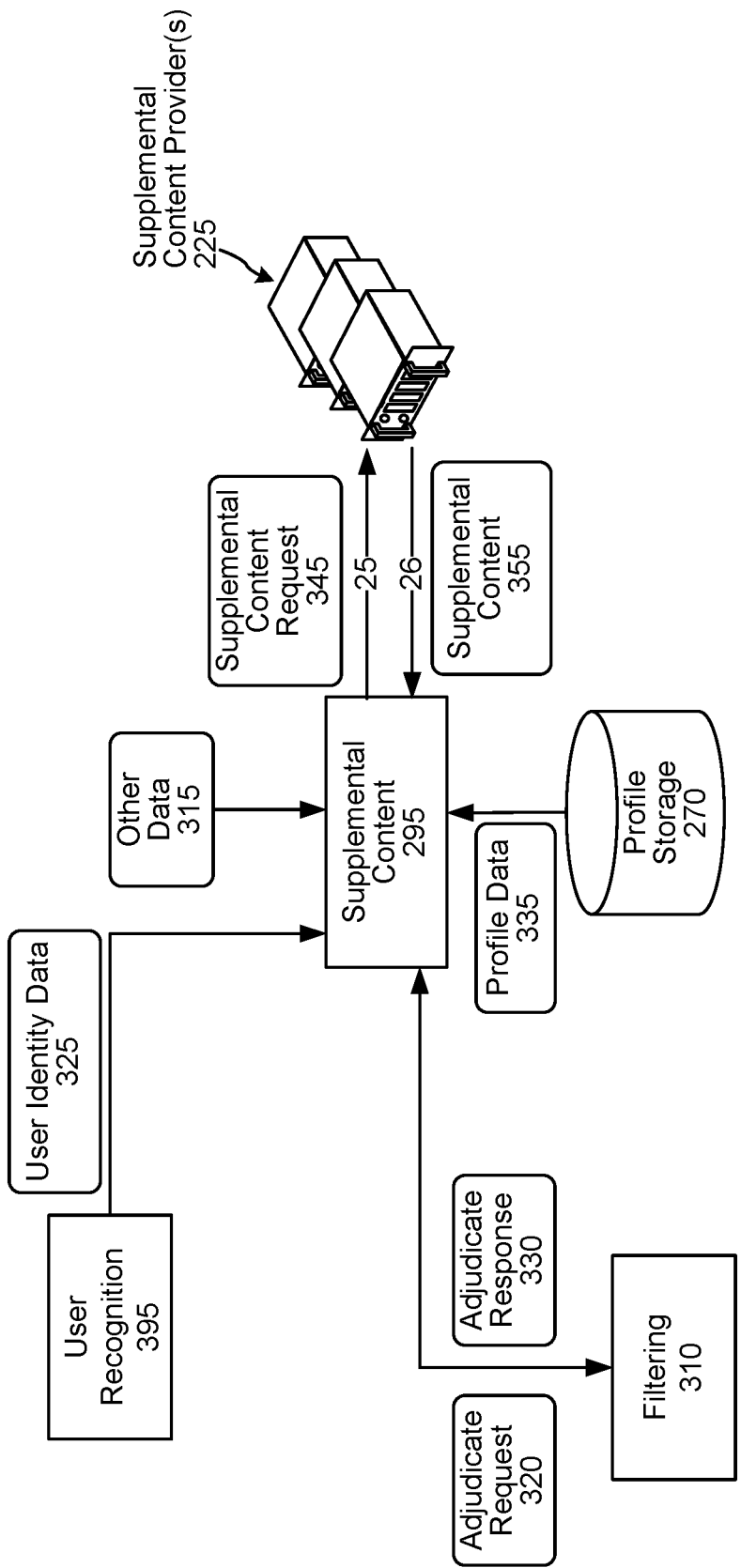
FIG. 3 is a conceptual diagram illustrating how a supplemental content system may process to output supplemental visual content, according to embodiments of the present disclosure.

Referring to FIG. 3, the supplemental content component 295 may determine supplemental content associated with but not directly responsive to the dialog as well as determine whether the supplemental content should be output to the user 105. In some instances, each time the NLU component 260 outputs NLU output data, the dialog management component 265 may determine supplemental content should be output and may cause the NLU output data to be input to the supplemental content component 295 (step 24 in FIG. 2B). The supplemental content component 295 may determine whether supplemental content associated with but not directly responsive to the user input should be output.

The supplemental content component 295 may base its determinations at least in part on non-user specific data, such as skill-provided data, system generated intent pairs, etc.

The supplemental content component 295 may determine whether supplemental content should be output based on data accompanying output data provided to the system component(s) 220 by a skill component 290. Such data may be represented as other data 315. In addition to providing output data responsive to a user input, the skill component 290 may provide presentation framework data. The presentation framework data may include information indicating the types of content (e.g., audio, image, video, etc.) represented in the skill output data as well as how the skill output data is to be presented using one or more devices associated with the user 105. The presentation framework data may, in some instances, also include information indicating the system component(s) 220 may determine supplemental content associated with the skill output data, but is not directly responsive to the user input. When the presentation framework data includes such information, the dialog management component 265 may determine supplemental content may be output.

The supplemental content component 295 may also determine whether supplemental content should be output based on data provided by a skill component 290, with the data not accompanying skill output data. Such data is represented as other data 315. A skill component 290 may provide data indicating that any time NLU output data indicates a particular intent, the supplemental content component 295 should query the skill component 290 as to whether the skill component 290 has supplemental content that may be output. For example, a concert ticket skill component may provide data indicating that anytime NLU output data indicates a <PlayMusic>intent, the supplemental content component 295 should query the concert ticket skill component as to whether the concert ticket skill component has access to information indicating a concert put on by a resolved artist entity represented in the NLU output data. For further example, an electronic calendar skill component may provide data indicating that anytime NLU output data indicates an<OutputTime>intent, the supplemental content component 295 should query the electronic calendar skill component as to whether the electronic calendar skill component has calendar entries associated with an electronic calendar associated with the primary device 110a and/or the user 105. Yet further, for example, a traffic report skill component may provide data indicating that anytime NLU output data indicates a<BookRide>intent, the supplemental content component 295 should query the traffic report skill component to provide current traffic report information.

The supplemental content component 295 may also determine whether supplemental content should be output based on the intent represented in NLU output data. The system component(s) 220 may store intent pair data (illustrated as other data 315) corresponding to pairs of intents. Each pair of intents may be associated with a respective score representing a likelihood that a second intent of the pair will be invoked by a user within a time threshold subsequent to content responsive to the first intent being output. The scores of various intent pairs may be normalized. The intent pair data may be untailored with respect to any given user of the system 200. For example, the intent pair data may include the following intent pairs with corresponding scores:

[0.345]; <GetWeather>; <GetTraffic>
[0.217]; <OrderPizza>; <PlayMovie>
[0.121]; <PlayMusic>; <SetVolume>

The intent pair data may be configured based solely upon the natures of the intents. For example, a pair of intents may include a<PlayMusic>intent and a<Change Volume>intent. The pair of intents may be associated with a score representing a likelihood that a user may input a first user input corresponding to the <PlayMusic>intent immediately prior to the user inputting a second user input corresponding to the <Change Volume>intent based solely on the <PlayMusic>intent and the <ChangeVolume>intent both relating to output of audio. For further example, a pair of intents may include a<BookPlaneTicket>intent and a<GetWeather>intent. This pair of intents may be associated with a score indicating a likelihood that users who by plane tickets often ask about the weather for their destination.

Intents may also be paired based on system usage history associated with various different users. Pairing of the intents may be skill component agnostic. Thus, both the first and second intents of a pair of intents may be associated with a single skill component, or the first intent of the pair may be associated with a first skill component while the second intent of the pair may be associated with a second skill componenbt. For example, a pair of intents may include a<PlayMusic>intent and a<Change Volume>intent, where both the <PlayMucic>intent and the <Change Volume>intent correspond to a music skill component. For further example, a pair of intents may include a<BookPlaneTicket>intent and a<GetWeather>intent, where the <BookPlaneTicket>intent corresponds to a booking skill component and the <GetWeather>intent corresponds to a weather skill component. Pairing of the intents may also be agnostic with respect to the 1P or 3P nature of the skill components associated with the intents. That is, both of the intents of a pair may be associated with one or more skill components implemented by the system component(s) 220, both of the intents of a pair may be associated with one or more 3P skill systems (illustrated in FIG. 4) in communication with the system component(s) 220, or a first intent of a pair may be associated with a 1P skill component while the second intent of the pair is associated with a 3P skill component. For example, a pair of intents may include a<PlayMusic>intent and a<ChangeVolume>intent, where both the <PlayMusic>intent and the <ChangeVolume>intent are executed by a 1P skill component. For further example, a pair of intents may include a<PlayMusic>intent and a<ChangeVolume>intent, where both the <PlayMusic>intent and the <ChangeVolume>intent are executed by a 3P music skill system. For further example, a pair of intents may include a<BookPlaneTicket>intent and a<PlayMusic>intent, where the <BookPlaneTicket>intent is executed by a 3P skill system and the <PlayMusic>intent is executed by a 1P skill component.

The intent pair data may alternatively be user-specific. For example, if a user routinely invokes a<ChangeVolume>intent subsequent to a<PlayMusic>intent, the system component(s) 220 may increase the score associated with a pair of intents corresponding to these intents. Conversely, if the user rarely invokes the <ChangeVolume>intent subsequent to the <PlayMusic>intent, the system component(s) 220 may decrease the score associated with a pair of intents correspond to these intents.

The supplemental content component 295 may base determinations at least in part on present user input originating user-specific data. Each user may have a different tolerance regarding how many times supplemental content is output in a given period of time, what kinds of supplemental content are output, as well as how supplemental content is presented.

The supplemental content component 295 may receive user identity data 325 from a user recognition component 395. The user identity data 325 may indicate the user 105 that provided a most-recent user input of the dialog (e.g., include a user identifier of the user 105).

If the supplemental content component 295 determines supplemental content should be output, the supplemental content component 295 generates a supplemental content request 345 and sends (step 25 in FIGS. 2B and 3) the supplemental content request 345 to a supplemental content provider(s) 225 configured to determine supplemental content associated with but not directly responsive to the current user input. The supplemental content request 345 may include at least a portion of NLU output data for a user input of the ongoing or recently ended dialog, and optionally at least a portion of the user's profile data 335 and/or at least a portion of the other data 315.

In some embodiments, the supplemental content request 345 may include data detailing one or more characteristics (e.g., resolution, aspect ratio, etc.) of the display of the secondary device 110b to be used to present visual supplemental content. In some embodiments, the supplemental content request 345 may include data indicating a display can be used to present visual supplemental content, but the data may not indicate any particular characteristics of the display of the secondary device 110b. In some embodiments, the supplemental content request 345 may not include any information on the secondary device 110b or its display.

The supplemental content component 295 may determine a skill component(s) from which to receive supplemental content from based on NLU output data corresponding to a user input of the ongoing or recently ended dialog. For example, the supplemental content component 295 may determine NLU output data includes a<PlayMusic>intent and a resolved artist of "[music artist]". Based thereon, the supplemental content component 295 may determine a concert booking skill component to query for supplemental content.

The supplemental content component 295 may send the supplemental content request 345 to one or more supplemental content provider(s) 225. A supplemental content provider(s) 225 may provide the supplemental content component 295 with supplemental content 355 associated with but not directly responsive to a user input of the ongoing or recently ended dialog.

A supplemental content provider(s) 225 may process the supplemental content request 345 to determine supplemental content 355 including text or tokenized supplemental content and/or visual supplemental content (e.g., image data, video data, and/or text data to be displayed) or a link to visual data.

In response to receiving the supplemental content 355 (step 26 in FIGS. 2B and 3), the supplemental content component 295 may send an adjudicate request 320, corresponding to the supplemental content 355, to a filtering component 310. The filtering component 310 may generate adjudicate response data 330 for the supplemental content 355. If the adjudicate response data 330 indicates the supplemental content 355 may be output, the supplemental content component 295 may, in response to receiving the adjudicate response data 330, output the supplemental content 355 to the user 105 via the primary device 110a and/or the secondary device 110b.

In some instances, more than one supplemental content provider(s) 225 may send supplemental content to the supplemental content component 295. In such instances, the supplemental content component 295 may send an adjudicate request for each supplemental content to the filtering component 310 and the filtering component 310 may generate an adjudicate response for each adjudicate request. The supplemental content component 295 may then rank which single supplemental content, of the various instances of supplemental content, should be output based at least in part on the adjudicate responses.

In some embodiments, the supplemental content component 295 may send a batch adjudicate request, indicating various instances of supplemental content, to the filtering component 310. In such embodiments, the filtering component 310 may generate a single adjudicate response representing decisions of an evaluation component for the different instances of supplemental content and the supplemental content component 295 may rank which single supplemental content to output based at least in part on the single adjudicate response.

In some instances, a supplemental content provider(s) 225 may be unable to determine supplemental content, and the supplemental content provider(s) 225 may provide the supplemental content component 295 with an indication of such.

The supplemental content component 295 may send (step 27) the supplemental content data, to be output, to the orchestrator component 230, and the orchestrator component 230 may send (step 28) the supplemental content data to the output rendering component 275. Additionally, the orchestrator component 230 may provide the output rendering component with the device identifiers of the primary device 110a and the secondary device 110b, as well as data indicating the primary device identifier is to be used to output audio and the secondary device identifier is to be used to output visual content. The output rendering component 275 may provide the text or tokenized supplemental content data to the TTS component and the visual supplemental content data to the visual rendering component 245. The TTS component 280 may generate, based on the text or tokenized supplemental content data, output audio data including synthesized speech corresponding to the audio supplemental content, as described herein below with respect to FIG. 4. The output rendering component 275 may send (step 29) the output audio data to the primary device 110*a* for output by a speaker(s) of the primary device 110*a*. The visual rendering component 245 may render output visual data of the visual supplemental content data corresponding to the screen and display capabilities of the secondary device 110*b*. The output rendering component 275 may send (step 30) the output visual supplemental content data to the secondary device 110*b* for display. In some embodiments, the supplemental content component 295 may output visual supplemental content data but not audio supplemental content data, and output visual data may be presented using the secondary device 110*b* without the primary device 110*a* being used to output (e.g., corresponding) audio supplemental content.

The foregoing description of FIGS. 2B and 3 describes the secondary device 110*b* being determined prior to the supplemental content component 295 being called to process, and the supplemental content component 295 being provided with information related to the secondary device 110*b* so the supplemental content component 295, and optionally supplemental content provider(s) 225, may consider same when determining or generating visual supplemental content data for output. In some embodiments, the supplemental content component 295 may be called to process prior to the secondary device 110*b* being determined. In such embodiments, the supplemental content component 295 may receive NLU output data and determine the visual, and optionally audio, supplemental content data based on the NLU output data but without consideration of which device will output the visual supplemental content data. At least partially in parallel to or after the supplemental content component 295 processes, the multi-endpoint skill context component 210 and the target determination component 240 may process to determine the secondary device 110*b* to be used to output the visual supplemental content data.

In some embodiments, one or more secondary device(s) 110 may be selected to output audio and visual content (including supplemental content) instead of the primary device 110*a*. In other words, instead of the primary device 110*a* outputting the audio content as described herein above, the secondary device 110*b* and/or another secondary device 110*c* may output the audio content. For example, skill configuration data may indicate at least one characteristic (e.g., speaker quality) to be used to output audio output by the corresponding skill component, and the target determination component 240 may receive receiving the skill configuration data and optionally a user preference indicating the user prefers audio content, such as music, to be presented on a particular device 110 (e.g., a high-end speaker). Thus, the target determination component 240 may determine, based on skill configuration data 256 and optionally the user preference, that a first secondary device 110*b* should be used to display visual content (e.g., lyrics for the music) and a second secondary device 110*c* (or the first secondary device 110*b*) should be used to output the audio content (e.g., music). In some situations, the target determining component 240 may determine a singular secondary device 110*b* is to output the audio and visual content.

Figure 4:
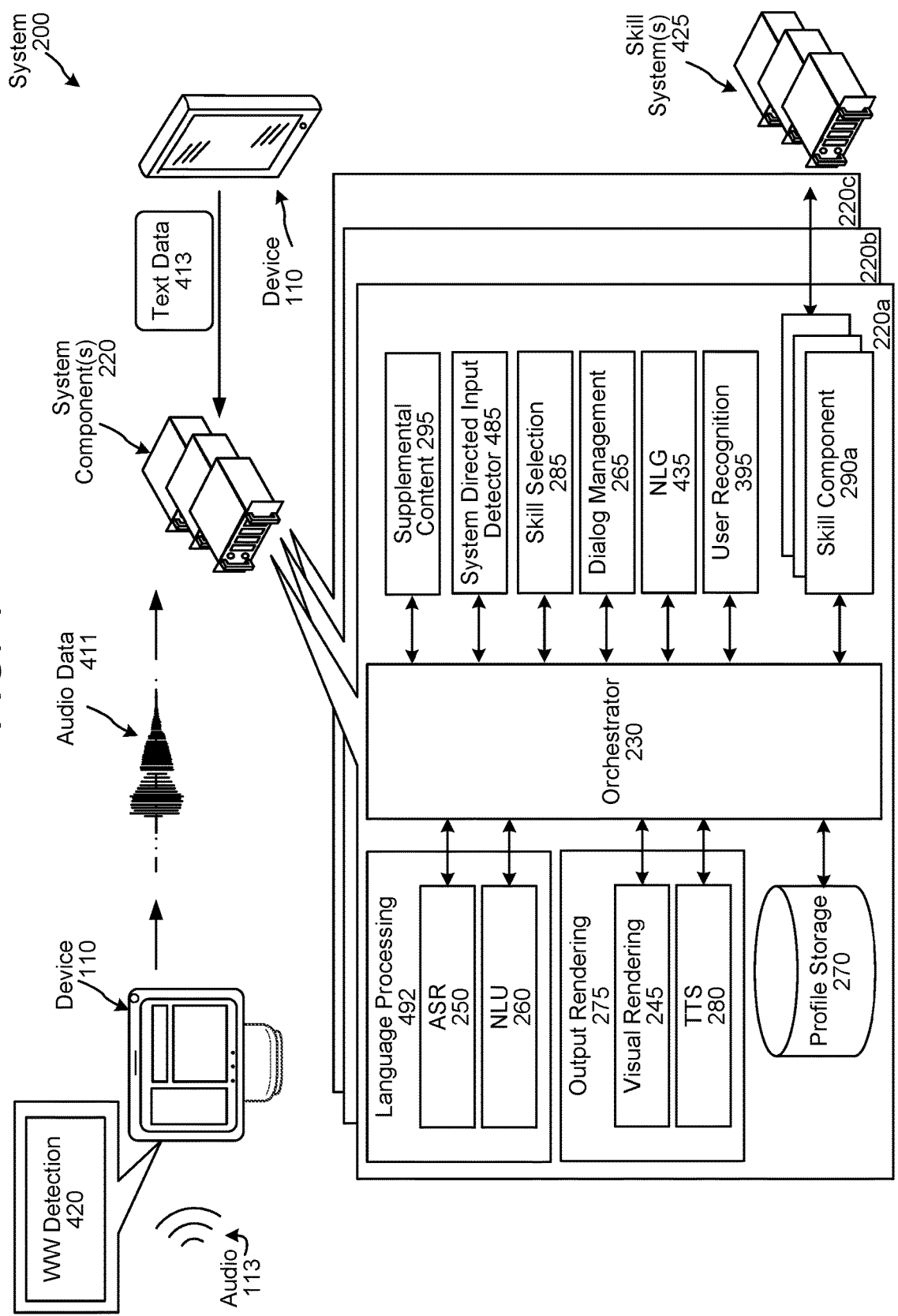
FIG. 4 is a conceptual diagram of components of the system, according to embodiments of the present disclosure.

The system 200 may operate using various components as described in FIG. 4. The various components may be located on same or different physical devices. Communication between various components may occur directly or across a network(s) 299. The device 110 may include audio capture component(s), such as a microphone or array of microphones of a device 110, captures audio 113 and creates corresponding audio data. Once speech is detected in audio data representing the audio 113, the device 110 may determine if the speech is directed at the device 110/system component(s) 220. In at least some embodiments, such determination may be made using a wakeword detection component 420. The wakeword detection component 420 may be configured to detect various wakewords. In at least some examples, each wakeword may correspond to a name of a different digital assistant. An example wakeword/digital assistant name is "Alexa." In another example, input to the system may be in form of text data 413, for example as a result of a user typing an input into a user interface of device 110. Other input forms may include indication that the user has pressed a physical or virtual button on device 110, the user has made a gesture, etc. The device 110 may also capture images using camera(s) 618 of the device 110 and may send image data representing those images to the system component(s) 220. The image data may include raw image data or image data processed by the device 110 before sending to the system component(s) 220. The image data may be used in various manners by different components of the system to perform operations such as determining whether a user is directing an utterance to the system, interpreting a user command, responding to a user command, etc.

The wakeword detector 420 of the device 110 may process the audio data, representing the audio 113, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 113, is analyzed to determine if specific characteristics of the audio data match preconfigured acoustic waveforms, audio signatures, or other data corresponding to a wakeword. Thus, the wakeword detection component 420 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 420 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 420 and/or input is detected by an input detector, the device 110 may "wake" and begin transmitting audio data 411, representing the audio 113, to the system component(s) 220. The audio data 411 may include data corresponding to the wakeword; in other embodiments, the portion of the audio corresponding to the wakeword is removed by the device 110 prior to sending the audio data 411 to the system component(s) 220. In the case of touch input detection or gesture based input detection, the audio data may not include a wakeword.

In some implementations, the system 200 may include more than one system component(s) 220. The system components 220 may respond to different wakewords and/or perform different categories of tasks. Each system component(s) 220 may be associated with its own wakeword such that speaking a certain wakeword results in audio data being sent to and processed by a particular system. For example, detection of the wakeword "Alexa" by the wakeword detector 420 may result in sending audio data to system component 220a for processing while detection of the wakeword "Computer" by the wakeword detector may result in sending audio data to system component 220b for processing. The system may have a separate wakeword and system for different skills/systems (e.g., "Dungeon Master" for a game play skill/system component 220c) and/or such skills/systems may be coordinated by one or more skill(s) 290 of one or more system components 220.

Figure 5:
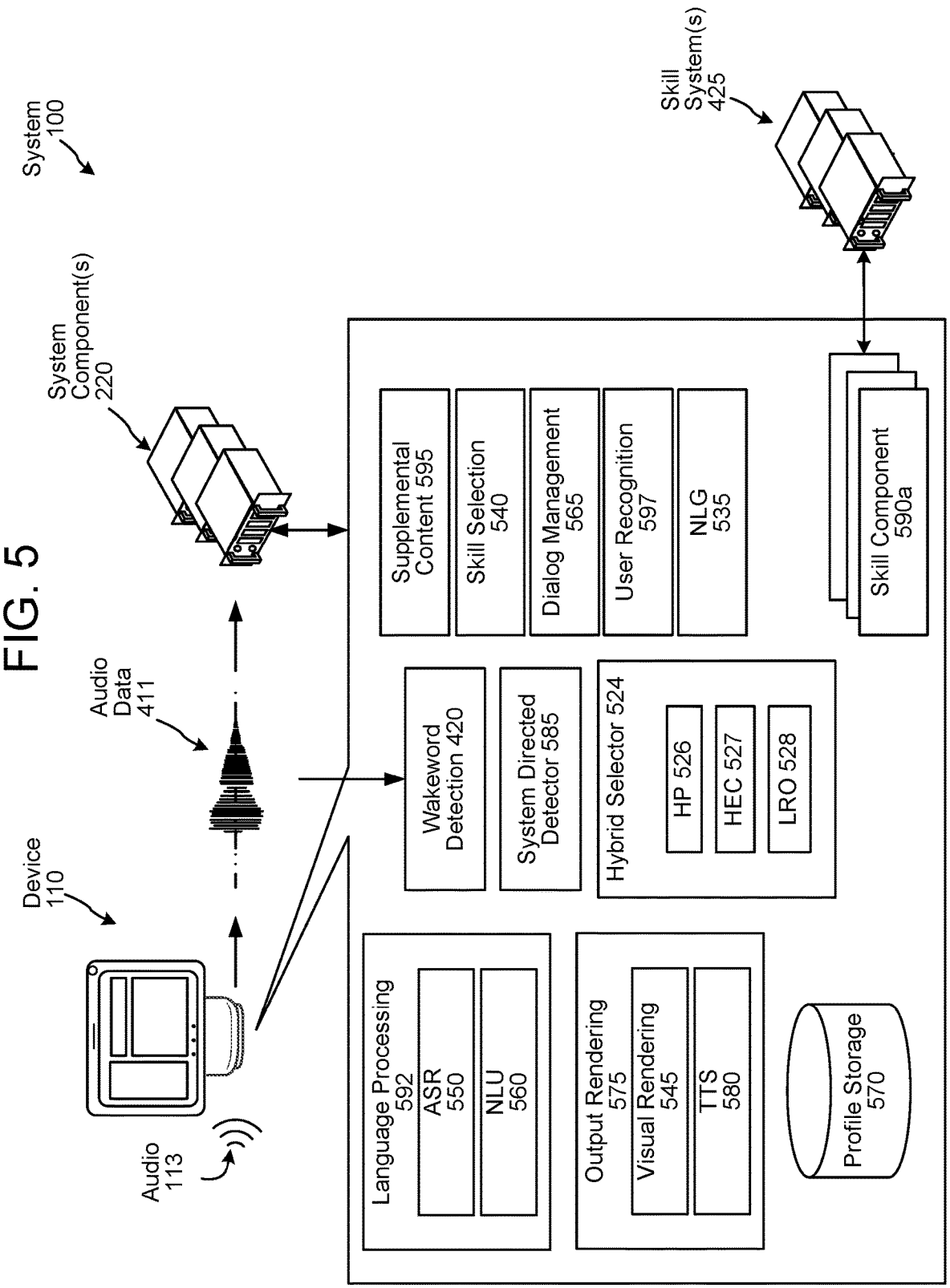
FIG. 5 is a conceptual diagram illustrating components that may be included in a device, according to embodiments of the present disclosure.

The device 110 may also include a system directed input detector 585 (illustrated in FIG. 5). The system component(s) 220 may also or alternatively include a system directed input detector 485 which may operate in a manner similar to the system directed input detector 585. The system directed input detector 585 may be configured to determine whether an input to the system (for example speech, a gesture, etc.) is directed to the system or not directed to the system (for example directed to another user, etc.). The system directed input detector 585 may work in conjunction with the wakeword detector 420. If the system directed input detector 585 determines an input is directed to the system, the device 110 may "wake" and begin sending captured data for further processing (for example, processing audio data using the language processing 492, processing captured image data using an image processing component, etc.). If data is being processed the device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 585 determines an input is not directed to the system (such as a speech or gesture directed to another user) the device 110 may discard the data and take no further action for processing purposes. In this way the system 200 may prevent processing of data not directed to the system, thus protecting user privacy. As an indicator to the user, however, the system may output an audio, visual, or other indicator when the system directed input detector 585 is determining whether an input is potentially device directed. For example, the system may output an orange indicator while considering an input, and may output a green indicator if a system directed input is detected. Other such configurations are possible.

Upon receipt by the system component(s) 220, the audio data 411 may be sent to the orchestrator component 230. The orchestrator component 230 may include memory and logic that enables the orchestrator component 230 to transmit various pieces and forms of data to various components of the system, as well as perform other operations as described herein.

The orchestrator component 230 may send the audio data 411 to a language processing component 492. The language processing component 492 (sometimes also referred to as a spoken language understanding (SLU) component) includes an automatic speech recognition (ASR) component 250 and a natural language understanding (NLU) component 260.

The ASR component 250 may process the input audio data to determine ASR output data including one or more ASR hypotheses corresponding to the words included in the spoken user input. An ASR hypothesis may be configured as a textual interpretation of the words, or may be configured in another manner, such as one or more tokens. Each ASR hypothesis may represent a different likely interpretation of the words spoken in the input audio data. Each ASR hypothesis may be associated with a score representing a confidence of ASR processing performed to determine the ASR hypothesis with which the score is associated.

The ASR component 250 interprets the speech in the input audio data based on a similarity between the audio data and pre-established language models. For example, the ASR component 250 may compare the input audio data with models for sounds (e.g., subword units, such as phonemes, etc.) and sequences of sounds to identify words that match the sequence of sounds of the speech represented in the input audio data.

The NLU component 260 may process the ASR output data with respect to the plurality of skill component identifiers to determine NLU output data including one or more NLU hypotheses. Each NLU hypothesis may be associated with a respective skill component represented in the skill component identifiers.

The NLU component 260 may perform intent classification (IC) processing on the ASR output data to determine an intent of the user input. An intent corresponds to an action responsive to the user input. To perform IC processing, the NLU component 260 may communicate with a database of words linked to intents. For example, a music intent database may link words and phrases such as "quiet," "volume off," and "mute" to a<Mute>intent. The NLU component 260 identifies intents by comparing words and phrases in the ASR output data to the words and phrases in an intents database. In some embodiments, the NLU component 260 may communicate with multiple intents databases, with each intents database corresponding to one or more intents associated with a particular skill component.

For example, IC processing of the user input "play my workout playlist" may determine an intent of <PlayMusic>. For further example, IC processing of the user input "call mom" may determine an intent of <Call>. In another example, IC processing of the user input "call mom using video" may determine an intent of <VideoCall>. In yet another example, IC processing of the user input "what is today's weather" may determine an intent of <OutputWeather>.

The NLU component 260 may also perform named entity recognition (NER) processing on the ASR output data to determine one or more portions, sometimes referred to as slots, of the user input that may be needed for post-NLU processing (e.g., processing performed by a skill component). For example, NER processing of the user input "play [song name]" may determine an entity type of "SongName" and an entity value corresponding to the indicated song name. For further example, NER processing of the user input "call mom" may determine an entity type of "Recipient" and an entity value corresponding to "mom." In another example, NER processing of the user input "what is today's weather" may determine an entity type of "Date" and an entity value of "today."

In some embodiments, an intent may be linked to one or more entity types to be populated with entity values. For example, a<PlayMusic>intent may be associated with an "artist name" entity type, an "album name" entity type, and/or a "song name" entity type.

For example, the NLU component 260 may perform NER processing to identify words in ASR output data as subject, object, verb, preposition, etc. based on grammar rules and/or models. Then, the NLU component 260 may perform IC processing using the identified verb to identify an intent. Thereafter, the NLU component 260 may again perform NER processing to determine the entity type(s) associated with the identified intent. For example, a model for a<PlayMusic>intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data using heuristic grammar rules, or a model may be constructed using techniques such as hidden Markov models, maximum entropy models, log linear models, conditional random fields (CRFs), and the like. For example, NER processing with respect to a music skill component may include parsing and tagging ASR output data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill component, which IC processing determines corresponds to a<PlayMusic>intent.

The NLU component 260 may generate NLU output data including one or more NLU hypotheses, where each NLU hypothesis includes an intent and optionally one or more entity types and corresponding entity values. In some embodiments, a NLU hypothesis may be associated with a score representing a confidence of NLU processing performed to determine the NLU hypothesis with which the score is associated.

The NLU component 260 may also perform domain classification (DC) processing to determine a domain corresponding to the user input. As defined herein above, a "domain" may refer to a collection of related functionality. A domain may be associated with one or more skill components performing related functionality. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality).

In some embodiments, the NLU component 260 may not limit processing to being performed with respect to only the skill component that output a response to a previous user input. Such configuration of the NLU component 260 enables the NLU component 260 to understand an instant user input referring to displayed content provided by a source other than the aforementioned skill component.

As described above, speech processing may be performed using two different components (e.g., the ASR component 250 and the NLU component 260). In some embodiments, a spoken language understanding (SLU) component may be configured to process audio data to determine NLU output data.

The SLU component may be equivalent to a combination of the ASR component 250 and the NLU component 260. Yet, the SLU component may process audio data and directly determine the NLU output data, without an intermediate step of generating ASR output data. As such, the SLU component may take audio data representing speech and attempt to make a semantic interpretation of the speech. The SLU component may output NLU output data including a most likely NLU hypothesis, or multiple NLU hypotheses associated with respective confidence or other scores (such as probability scores, etc.).

The skill selection component 285 may be configured to determine a skill component, or n-best list of skill components, where each skill component is associated with a confidence score/value, to execute for responding to the user input. The skill selection component 285 may include a skill component proposal component, a skill component pre-response component, and a skill component ranking component.

The skill component proposal component is configured to determine skill components capable of processing in response to the user input. In addition to receiving the NLU output data, the skill component proposal component may receive context data corresponding to the user input. For example, the context data may indicate a skill component that was causing the device 110 to output content (e.g., music, video, synthesized speech, etc.) when the device 110 captured the user input, one or more skill components that are indicated as enabled in a profile (as stored in the profile storage 270) associated with the user 105, output capabilities of the device 110, a geographic location of the device 110, and/or other context data corresponding to the user input.

The skill component proposal component may implement skill component proposal rules. A skill component developer, via a skill component developer device, may provide one or more rules representing when a skill component should be invoked to respond to a user input. In some embodiments, such a rule may be specific to an intent. In such embodiments, if a skill component is configured to execute with respect to multiple intents, the skill component may be associated with more than one rule, such as each rule corresponding to a different intent capable of being handled by the skill component. In addition to being specific to an intent, a rule may indicate one or more entity identifiers with respect to which the skill component should be invoked. For further example, a rule may indicate output capabilities of a device, a geographic location, and/or other conditions.

Each skill component may be associated with each rule corresponding to the skill component. As an example, a rule may indicate a video skill component may execute when a user input corresponds to a "Play Video" intent and the device 110 includes or is otherwise associated with a display. As another example, a rule may indicate a music skill component may execute when a user input corresponds to a "PlayMusic" intent and music is being output by a device when the device captures the user input. It will be appreciated that other examples are possible. The foregoing rules enable skill components to be differentially proposed at runtime, based on various conditions, in systems where multiple skill components are configured to execute with respect to the same intent.

The skill component proposal component, using the NLU output data, received context data, and the foregoing described skill component proposal rules, determines skill components configured to process in response to the user input. Thus, in some embodiments, the skill component proposal component may be implemented as a rules engine. In some embodiments, the skill component proposal component may make binary (e.g., yes/no, true/false, etc.) determinations regarding whether a skill component is configured to process in response to the user input. For example, the skill component proposal component may determine a skill component is configured to process, in response to the user input, if the skill component is associated with a rule corresponding to the intent, represented in the NLU output data, and the context data.

In some embodiments, the skill component proposal component may make such binary determinations with respect to all skill components. In some embodiments, the skill component proposal component may make the binary determinations with respect to only some skill components, such as only skill components indicated as enabled in the user profile of the user 105.

After the skill component proposal component is finished processing, the skill component pre-response component may be called to execute. The skill component pre-response component is configured to query skill components, determined by the skill component proposal component as configured to process the user input, as to whether the skill components are in fact able to respond to the user input. The skill component pre-response component may take as input the NLU output data including one or more NLU hypotheses, where each of the one or more NLU hypotheses is associated with a particular skill component determined by the skill component proposal component as being configured to respond to the user input.

The skill component pre-response component sends a pre-response query to each skill component determined by the skill component proposal component. A pre-response query may include the NLU hypothesis associated with the skill component, and optionally other context data corresponding to the user input.

A skill component may determine, based on a received pre-response query and optionally other data available to the skill component, whether the skill component is capable of respond to the user input. For example, a skill component may generate a pre-response indicating the skill component can respond to the user input, indicating the skill component needs more data to determine whether the skill component can respond to the user input, or indicating the skill component cannot respond to the user input.

In situations where a skill component's pre-response indicates the skill component can respond to the user input, or indicating the skill component needs more information, the skill component's pre-response may also include various other data representing a strength of the skill component's potential response to the user input. Such other data may positively influence the skill component's ranking by the skill component ranking component of the skill selection component 285. For example, such other data may indicate capabilities, such as output capabilities or components (e.g., a connected screen, loudspeaker, etc.) of a device to be used to output the skill component's response; pricing data corresponding to a product or service the user input is requesting be purchased or is requesting information for; availability of a product the user input is requesting be purchased; whether there are shipping fees for a product the user input is requesting be purchased; whether the user 105 already has a profile and/or subscription with the skill component; that the user 105 does not have a subscription with the skill component, but that there is a free trial/tier the skill component is offering; with respect to a taxi skill component, a cost of a trip based on start and end locations, how long the user 105 would have to wait to be picked up, etc.; and/or other data available to the skill component that is related to the skill component's processing of the user input. In some embodiments, the pre-response of a skill component may include an indicator (e.g., flag) representing a strength of the skill component's ability to personalize its response to the user input.

In some embodiments, a skill component's pre-response may be configured to a pre-defined schema. By requiring pre-responses to conform to a specific schema, such as by requiring skill components to only be able to provide certain types of data in pre-responses, new skill components may be onboarded into the skill component selection functionality without needing to reconfigure the skill selection component 285 each time a new skill component is onboarded. Moreover, requiring pre-responses to conform to a schema limits the amount of values needed to be used to train and implement a machine learning (ML) model for ranking skill components.

In some embodiments, a skill component's pre-response may indicate whether the skill component requests exclusive display access (i.e., whether the skill component requests its visual data be presented on an entirety of the display).

After the skill component pre-response component queries the skill components for pre-responses, the skill component ranking component may be called to execute. The skill component ranking component may be configured to select a single skill component, from among the skill components determined by the skill component proposal component, to respond to the user input. In some embodiments, the skill component ranking component may implement a ML model. In some embodiments, the ML model may be a deep neural network (DNN).

The skill component ranking component may take as input the NLU output data, the skill component pre-responses, one or more skill component preferences of the user 105, such as represented in a user profile or group profile stored in the profile storage 270, NLU confidence scores of the NLU output data, a device type of the device 110, data indicating whether the device 110 was outputting content when the user input was received, and/or other context data available to the skill component ranking component.

The skill component ranking component may rank the skill components using the ML model. Factors that may increase the ranking of a skill component may include, for example, that the skill component is associated with a pre-response indicating the skill component may generate a response that is personalized to the user 105, that a NLU hypothesis corresponding to the skill component is associated with a NLU confidence score satisfying a condition (e.g., a threshold NLU confidence score) that the skill component was outputting content via the device 110 when the device 110 received the user input, etc. Factors that may decrease the ranking of aa skill component may include, for example, that the skill component is associated with a pre-response indicating the skill component cannot generate a response that is personalized to the user 105, that a NLU hypothesis corresponding to the skill component is associated with a NLU confidence score failing to satisfy a condition (e.g., a threshold NLU confidence score, etc.).

The skill component ranking component may generate a score for each skill component determined by the skill component proposal component, where the score represents a strength with which the skill component ranking component recommends the associated skill component be executed to respond to the user input. Such a confidence score may be a numeric score (e.g., between 0 and 1) or a binned score (e.g., low, medium, high).

A skill component 290 may process NLU output data and perform one or more actions in response thereto. For example, for NLU output data including a<PlayMusic>intent, an "artist" entity type, and an artist name as an entity value, a music skill component may output music sung by the indicated artist. For further example, for NLU output data including a <TurnOn>intent, a "device" entity type, and an entity value of "lights," a smart home skill component may cause one or more "smart" lights to operate in an "on" state. In another example, for NLU output data including an<OutputWeather>intent, a "location" entity type, and an entity value corresponding to a geographic location of the device 110, a weather skill component may output weather information for the geographic location. For further example, for NLU output data including a<BookRide>intent, a taxi skill component may book a requested ride. In another example, for NLU output data including a<BuyPizza>intent, a restaurant skill component may place an order for a pizza. In another example, for NLU output data including an <OutputStory>intent and a "title" entity type and corresponding title entity value, a story skill component may output a story corresponding to the title.

A skill component may operate in conjunction between the device 110/system component(s) 220 and other devices, such as a restaurant electronic ordering system, a taxi electronic booking system, etc. in order to complete certain functions. Inputs to a skill component may come from speech processing interactions or through other interactions or input sources.

A skill component may be associated with a domain, a non-limiting list of which includes a smart home domain, a music domain, a video domain, a weather domain, a communications domain, a flash briefing domain, a shopping domain, and a custom domain.

The system component(s) 220 may be configured with more than one skill component 290. For example, a weather service skill component may enable the system component(s) 220 to provide weather information, a car service skill component may enable the system component(s) 220 to book a trip with respect to a taxi or ride sharing service, a restaurant skill component may enable the system component(s) 220 to order a pizza with respect to the restaurant's online ordering system, etc. Inputs to a skill component 290 may come from speech processing interactions or through other interactions or input sources. A skill component 290 may include hardware, software, firmware, or the like that may be dedicated to a particular skill component 290 or shared among different skill components 290.

A skill support system(s) 425 may communicate with a skill component(s) 290 within the system component(s) 220 and/or directly with the orchestrator component 230 or with other components. A skill support system(s) 425 may be configured to perform one or more actions. An ability to perform such action(s) may sometimes be referred to as a "skill." That is, a skill may enable a skill support system(s) 425 to execute specific functionality in order to provide data or perform some other action requested by a user. For example, a weather service skill may enable a skill support system(s) 425 to provide weather information to the system component(s) 220, a car service skill may enable a skill support system(s) 425 to book a trip with respect to a taxi or ride sharing service, an order pizza skill may enable a skill support system(s) 425 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 220 may be configured with a skill component 290 dedicated to interacting with the skill support system(s) 425. Unless expressly stated otherwise, reference to a skill, skill device, or skill component may include a skill component 290 operated by the system component(s) 220 and/or skill operated by the skill support system(s) 425. Moreover, the functionality described herein as a skill or skill may be referred to using many different terms, such as an action, bot, app, or the like. The skill 290 and or skill support system(s) 425 may return output data to the orchestrator component 230.

The skill component 290 may process to determine output data responsive to the spoken user input, such as based on the intent and entity data as represented in the NLU output data received by the skill component 290. As detailed herein above, the output data may include one or more instances of visual data for display by the device 110.

The TTS component 280 is configured to generate output audio data including synthesized speech. The TTS component 280 may perform speech synthesis using one or more different methods. In one method of synthesis called unit selection, the TTS component 280 matches a database of recorded speech against the data input to the TTS component 280. The TTS component 280 matches the input data against spoken audio units in the database. Matching units are selected and concatenated together to form a speech output. Each unit includes an audio waveform corresponding with a phonetic unit, such as a short wav file of the specific sound, along with a description of the various acoustic features associated with the .wav file, such as its pitch, energy, etc., as well as other information, such as where the phonetic unit appears in a word, sentence, or phrase, the neighboring phonetic units, etc. Using all the information in the unit database, the TTS component 280 may match units to the input data to create a natural sounding waveform. The unit database may include multiple examples of phonetic units to provide the TTS component 280 with many different options for concatenating units into speech. One benefit of unit selection is that, depending on the size of the database, a natural sounding speech output may be generated. The larger the unit database, the more likely the TTS component 280 may be able to construct natural sounding speech.

Unit selection speech synthesis may be performed as follows. Unit selection includes a two-step process. First the TTS component 280 may determine which speech units to use and then may combine them such that the particular combined units match the desired phonemes and acoustic features to create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well a given speech unit matches the features of a desired speech output (e.g., pitch, prosody, etc.). A join cost represents how well a speech unit matches a consecutive speech unit for purposes of concatenating the speech units together in the eventual synthesized speech. The overall cost function is a combination of target cost, join cost, and other costs that may be determined by the TTS component 280. As part of unit selection, the unit selection engine may select the speech unit with the lowest overall combined cost. For example, a speech unit with a very low target cost may not necessarily be selected if it has a join cost that is high.

In another method of synthesis called parametric synthesis, parameters such as frequency, volume, noise, etc. are varied by the TTS component 280 to create an artificial speech waveform output. Parametric synthesis may use an acoustic model and various statistical techniques to match data, input to the TTS component 280, with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. The TTS component 280 may include an acoustic model, or other models, which may convert data, input to the TTS component 280, into a synthetic acoustic waveform based on audio signal manipulation. The acoustic model includes rules that may be used to assign specific audio waveform parameters to input phonetic units and/or prosodic annotations. The rules may be used to calculate a score representing a likelihood that a particular audio output parameter(s), such as frequency, volume, etc., corresponds to the portion of the input data.

The TTS component 280 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (e.g., a digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts, such as the phoneme identity, stress, accent, position, etc. An initial determination of a probability of a potential phoneme may be associated with one state. As new text is processed by the TTS component 280, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the TTS component 280 may also calculate potential states for other potential audio outputs, such as various ways of pronouncing phoneme/E/, as potential acoustic matches for the phonetic unit. In this manner multiple states and state transition probabilities may be calculated.

The probable states and probable state transitions calculated by the TTS component 280 may lead to a number of potential audio output sequences. Based on the acoustic model and other potential models, the potential audio output sequences may be scored according to a confidence level of the TTS component 280. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input data.

In some embodiments, the TTS component 280 may be configured to generate synthesized speech corresponding to a response to the user input, as provided by the skill component 290, as well as including a summary of the one or more instances of visual supplemental content presented in the visual response described herein.

The profile storage 270 may include a variety of data related to individual users, groups of users, devices, etc. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill component enablement data; and/or other data.

The profile storage 270 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill component identifiers of skill components that the user has enabled. When a user enables a skill component, the user is providing permission to allow the skill component to execute with respect to the user's inputs. If a user does not enable a skill component, the skill component may be prevented from processing with respect to the user's inputs.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 270 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household. The device profile may include location data. The location data may include the general location of the device as well as specific placement or locality data, such as kitchen, living room, lobby, board room, home, office, global positioning system coordinates, etc.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

In addition to determining when supplemental content should be output, the dialog management component 265 may perform other operations related to managing and tracking a dialog.

The dialog management component 265 may receive the ASR hypothesis/hypotheses (i.e., text data) and make a semantic interpretation of the phrase(s) or statement(s) represented therein. That is, the dialog management component 265 determines one or more meanings associated with the phrase(s) or statement(s) represented in the text data based on words represented in the text data. The dialog management component 265 determines a goal corresponding to an action that a user desires be performed as well as pieces of the text data that allow a device (e.g., the device 110, the system component(s) 220, a skill component 290, a skill system(s) 425, etc.) to execute the intent. If, for example, the text data corresponds to "what is the weather," the dialog management component 265 may determine that that the system component(s) 220 is to output weather information associated with a geographic location of the device 110. In another example, if the text data corresponds to "turn off the lights," the dialog management component 265 may determine that the system component(s) 220 is to turn off lights associated with the device(s) 110 or the user(s) 5.

A NLG component 435 may generate dialog data based on one or more response templates. Further continuing the example above, the NLG component 435 may select a template in response to the question, "What is the weather currently like?" of the form: "The weather currently is $weather_information$." The NLG component 435 may analyze the logical form of the template to produce one or more textual responses including markups and annotations to familiarize the response that is generated. In some embodiments, the NLG component 435 may determine which response is the most appropriate response to be selected. The selection may, therefore, be based on past responses, past questions, a level of formality, and/or any other feature, or any other combination thereof. Responsive audio data representing the response generated by the NLG component 435 may then be generated using the TTS component 280.

The user recognition component 395 may take as input the audio data 411 and/or text data output by the ASR component 250/550. The user recognition component 395 may perform user recognition by comparing audio characteristics in the audio data 411 to stored audio characteristics of users. The user recognition component 395 may also perform user recognition by comparing biometric data (e.g., fingerprint data, iris data, etc.), received by the system in correlation with the present user input, to stored biometric data of users assuming user permission and previous authorization. The user recognition component 395 may further perform user recognition by comparing image data (e.g., including a representation of at least a feature of a user), received by the system in correlation with the present user input, with stored image data including representations of features of different users. The user recognition component 395 may perform additional user recognition processes, including those known in the art.

The user recognition component 395 determines scores indicating whether user input originated from a particular user. For example, a first score may indicate a likelihood that the user input originated from a first user, a second score may indicate a likelihood that the user input originated from a second user, etc. The user recognition component 395 also determines an overall confidence regarding the accuracy of user recognition operations.

Output of the user recognition component 395 may include a single user identifier corresponding to the most likely user that originated the user input. Alternatively, output of the user recognition component 395 may include an N-best list of user identifiers with respective scores indicating likelihoods of respective users originating the user input. The output of the user recognition component 395 may be used to inform NLU processing as well as processing performed by other components of the system.

Although the components of FIG. 4 may be illustrated as part of system component(s) 220, device 110, or otherwise, the components may be arranged in other device(s) (such as in device 110 if illustrated in system component(s) 220 or vice-versa, or in other device(s) altogether) without departing from the disclosure. FIG. 5 illustrates such a configured device 110.

In at least some embodiments, the system component(s) 220 may receive the audio data 411 from the device 110, to recognize speech corresponding to a spoken input in the received audio data 411, and to perform functions in response to the recognized speech. In at least some embodiments, these functions involve sending directives (e.g., commands), from the system component(s) 220 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system component(s) 220 over the network(s) 299, some or all of the functions capable of being performed by the system component(s) 220 may be performed by sending one or more directives over the network(s) 299 to the device 110, which, in turn, may process the directive(s) and perform one or more corresponding actions. For example, the system component(s) 220, using a remote directive that is included in response data (e.g., a remote response), may instruct the device 110 to output an audible response (e.g., using TTS processing performed by an on-device TTS component 580) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system component(s) 220 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 4, the device 110 may include a wakeword detection component 420 configured to compare the audio data 411 to stored models used to detect a wakeword (e.g., "Alexa") that indicates to the device 110 that the audio data 411 is to be processed for determining NLU output data (e.g., slot data that corresponds to a named entity, label data, and/or intent data, etc.). In at least some embodiments, a hybrid selector 524, of the device 110, may send the audio data 411 to the wakeword detection component 420. If the wakeword detection component 420 detects a wakeword in the audio data 411, the wakeword detection component 420 may send an indication of such detection to the hybrid selector 524. In response to receiving the indication, the hybrid selector 524 may send the audio data 411 to the system component(s) 220 and/or the ASR component 550. The wakeword detection component 420 may also send an indication, to the hybrid selector 524, representing a wakeword was not detected. In response to receiving such an indication, the hybrid selector 524 may refrain from sending the audio data 411 to the system component(s) 220, and may prevent the ASR component 550 from further processing the audio data 411. In this situation, the audio data 411 can be discarded.

The device 110 may conduct its own speech processing using on-device language processing components, such as an SLU/language processing component 592 (which may include an ASR component 550 and an NLU 560), similar to the manner discussed herein with respect to the SLU component 492 (or ASR component 250 and the NLU component 260) of the system component(s) 220. Language processing component 592 may operate similarly to language processing component 492, ASR component 550 may operate similarly to ASR component and NLU component 560 may operate similarly to NLU component 260. The device 110 may also internally include, or otherwise have access to, other components such as one or more skill components 590 capable of executing commands based on NLU output data or other results determined by the device 110/system component(s) 220 (which may operate similarly to skill components 290), a supplemental content component 595 (configured to process in a similar manner to that discussed herein with respect to the supplemental content component 295 of the system component(s) 220), a skill selection component 540 (configured to process in a similar manner to that discussed herein with respect to the skill selection component 285 of the system component(s) 220), a dialog management component 565 (configured to process in a similar manner to that discussed herein with respect to the dialog management component 265 of the system component(s) 220), a user recognition component 597 (configured to process in a similar manner to that discussed herein with respect to the user recognition component 395 of the system component(s) 220), a NLG component 535 (configured to process in a similar manner to that discussed herein with respect to the NLG component 435 of the system component(s) 220), profile storage 570 (configured to store similar profile data to that discussed herein with respect to the profile storage 270 of the system component(s) 220), or other components. In at least some embodiments, the profile storage 570 may only store profile data for a user or group of users specifically associated with the device 110. Similar to as described above with respect to skill component 290, a skill component 590 may communicate with a skill system(s) 425. The device 110 may also have its own output rendering component 575 which may include a visual rendering component 545 (configured to process in a similar manner to that discussed herein with respect to the visual rendering component 245) and a TTS component 580 (configured to process in a similar manner to that discussed herein with respect to the TTS component 280).

In at least some embodiments, the on-device language processing components may not have the same capabilities as the language processing components of the system component(s) 220. For example, the on-device language processing components may be configured to handle only a subset of the natural language user inputs that may be handled by the system component(s) 220. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 220. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system component(s) 220.

The hybrid selector 524, of the device 110, may include a hybrid proxy (HP) 526 configured to proxy traffic to/from the system component(s) 220. For example, the HP 526 may be configured to send messages to/from a hybrid execution controller (HEC) 527 of the hybrid selector 524. For example, command/directive data received from the system component(s) 220 can be sent to the HEC 527 using the HP 526. The HP 526 may also be configured to allow the audio data 411 to pass to the system component(s) 220 while also receiving (e.g., intercepting) this audio data 411 and sending the audio data 411 to the HEC 527.

In at least some embodiments, the hybrid selector 524 may further include a local request orchestrator (LRO) 528 configured to notify the ASR component 550 about the availability of new audio data 411 that represents user speech, and to otherwise initiate the operations of local language processing when new audio data 411 becomes available. In general, the hybrid selector 524 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system component(s) 220 and chooses to use that remotely-determined directive data.

Thus, when the audio data 411 is received, the HP 526 may allow the audio data 411 to pass through to the system component(s) 220 and the HP 526 may also input the audio data 411 to the on-device ASR component 550 by routing the audio data 411 through the HEC 527 of the hybrid selector 524, whereby the LRO 528 notifies the ASR component 550 of the audio data 411. At this point, the hybrid selector 524 may wait for response data from either or both of the system component(s) 220 or the local language processing components. However, the disclosure is not limited thereto, and in some examples the hybrid selector 524 may send the audio data 411 only to the ASR component 550 without departing from the disclosure. For example, the device 110 may process the audio data 411 locally without sending the audio data 411 to the system component(s) 220.

The ASR component 550 is configured to receive the audio data 411 from the hybrid selector 524, and to recognize speech in the audio data 411, and the NLU component 560 is configured to determine a user intent from the recognized speech, and to determine how to act on the user intent by generating NLU output data which may include directive data (e.g., instructing a component to perform an action). Such NLU output data may take a form similar to that as determined by the NLU component 260 of the system component(s) 220. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 299. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 560) may be selected as usable to respond to a natural language user input, and local response data may be sent (e.g., local NLU output data, local knowledge base information, internet search results, and/or local directive data) to the hybrid selector 524, such as a "ReadyToExecute" response. The hybrid selector 524 may then determine whether to use directive data from the on-device components to respond to the natural language user input, to use directive data received from the system component(s) 220, assuming a remote response is even received (e.g., when the device 110 is able to access the system component(s) 220 over the network(s) 299), or to determine output audio requesting additional information from the user 5.

The device 110 and/or the system component(s) 220 may associate a unique identifier with each natural language user input. The device 110 may include the unique identifier when sending the audio data 411 to the system component(s) 220, and the response data from the system component(s) 220 may include the unique identifier to identify which natural language user input the response data corresponds.

In at least some embodiments, the device 110 may include, or be configured to use, one or more skill components 590 that may work similarly to the skill component(s) 290 implemented by the system component(s) 220. The skill component(s) 590 may correspond to one or more domains that are used in order to determine how to act on a spoken input in a particular way, such as by outputting a directive that corresponds to the determined intent, and which can be processed to implement the desired operation. The skill component(s) 590 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 425. For example, a skill system 425 may be located in a remote environment (e.g., separate location) such that the device 110 may only communicate with the skill system 425 via the network(s) 299. However, the disclosure is not limited thereto. For example, in at least some embodiments, a skill system 425 may be configured in a local environment (e.g., home server and/or the like) such that the device 110 may communicate with the skill system 425 via a private network, such as a local area network (LAN).

Similar to the manner discussed with regard to FIG. 4, the device 110 may be configured to recognize multiple different wakewords and/or perform different categories of tasks depending on the wakeword. Such different wakewords may invoke different processing components of device 110 (not illustrated in FIG. 5). For example, detection of the wakeword "Alexa" by the wakeword detector 420 may result in sending audio data to certain language processing components 592/skills 590 for processing while detection of the wakeword "Computer" by the wakeword detector may result in sending audio data different language processing components 592/skills 590 for processing.

Figure 6:
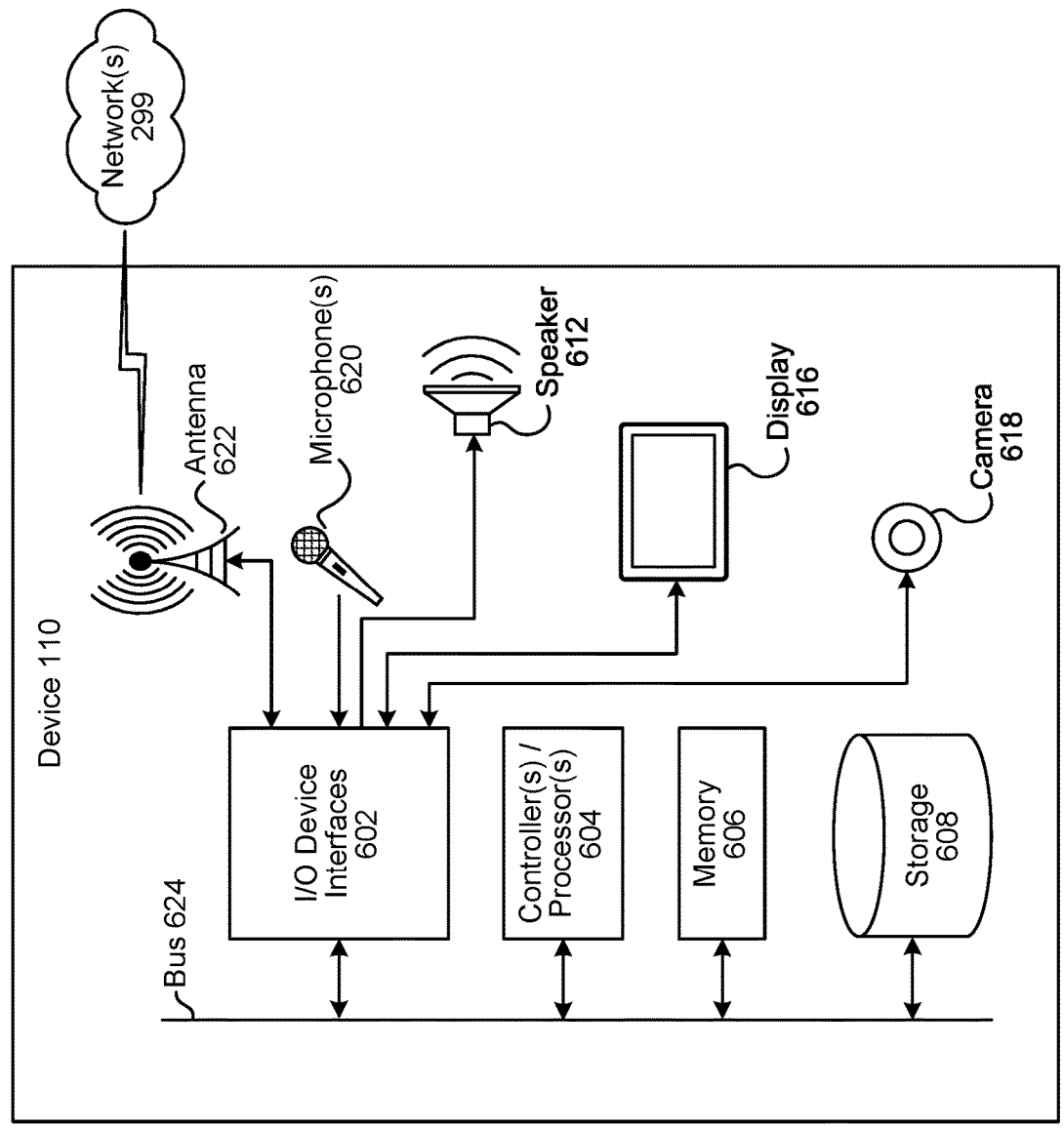
FIG. 6 is a block diagram conceptually illustrating example components of a device, according to embodiments of the present disclosure.
Figure 7:
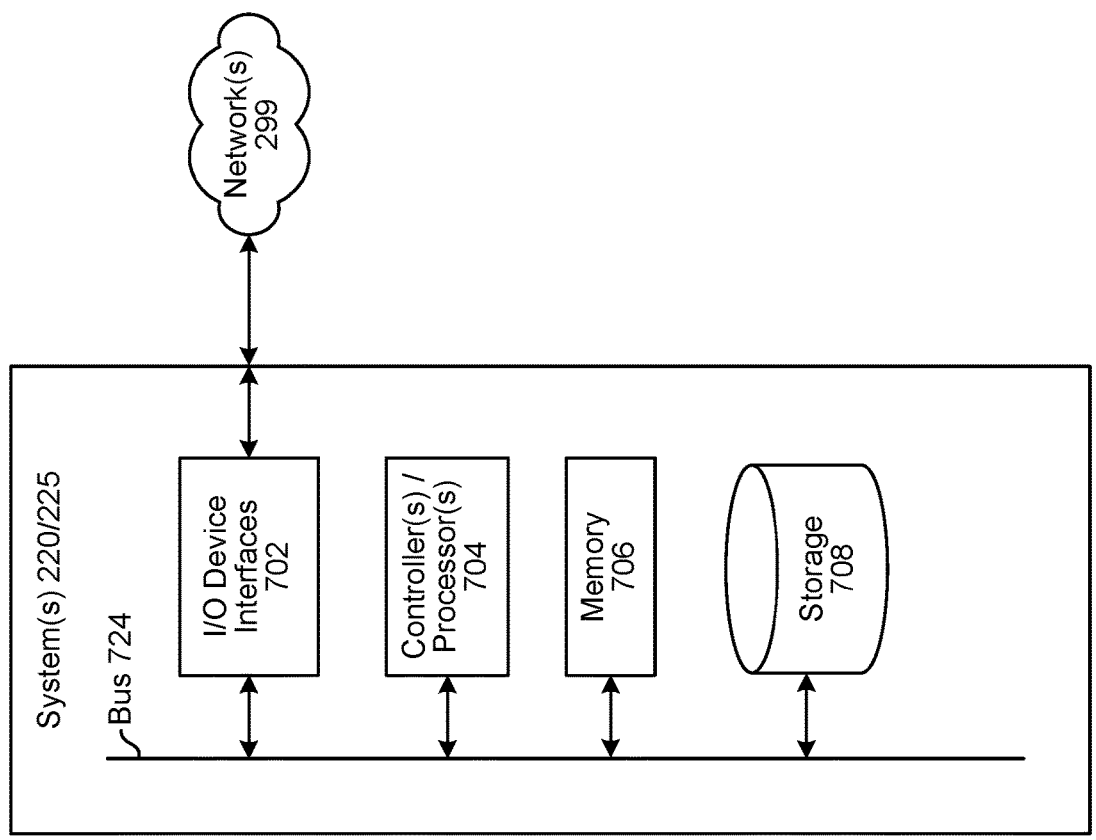
FIG. 7 is a block diagram conceptually illustrating example components of a system, according to embodiments of the present disclosure.

FIG. 6 is a block diagram conceptually illustrating a device 110 that may be used with the system. FIG. 7 is a block diagram conceptually illustrating example components of a remote device, such as the natural language command processing system component(s) 220, which may assist with ASR processing, NLU processing, etc., and a skill system 425. A system (220/425) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system component(s) 220 may be located remotely from the device 110 as its operations may not require proximity to the user. The server/system component(s) 220 may be located in an entirely different location from the device 110 (for example, as part of a cloud computing system or the like) or may be located in a safe environment as the device 110 but physically separated therefrom (for example a home server or similar device that resides in a user's home or business but perhaps in a closet, basement, attic, or the like). The system component(s) 220 may also be a version of a user device 110 that includes different (e.g., more) processing capabilities than other user device(s) 110 in a home/office. One benefit to the server/system component(s) 220 being in a user's home/business is that data used to process a command/return a response may be kept within the user's home, thus reducing potential privacy concerns.

Multiple systems (220/425) may be included in the system 200 of the present disclosure, such as one or more system components 220 for performing ASR processing, one or more system components 220 for performing NLU processing, one or more skill systems 425, etc. In operation, each of these systems may include computer-readable and computer-executable instructions that reside on the respective device (220/425), as will be discussed further below.

Each of these devices (110/220/425) may include one or more controllers/processors (604/704), which may each include a central processing unit (CPU) for processing data and computer-readable instructions, and a memory (606/706) for storing data and instructions of the respective device. The memories (606/706) may individually include volatile random access memory (RAM), non-volatile read only memory (ROM), non-volatile magnetoresistive memory (MRAM), and/or other types of memory. Each device (110/220/425) may also include a data storage component (608/708) for storing data and controller/processor-executable instructions. Each data storage component (608/708) may individually include one or more non-volatile storage types such as magnetic storage, optical storage, solid-state storage, etc. Each device (110/220/425) may also be connected to removable or external non-volatile memory and/or storage (such as a removable memory card, memory key drive, networked storage, etc.) through respective input/output device interfaces (602/702).

Computer instructions for operating each device (110/220/425) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/220/425) includes input/output device interfaces (602/702). A variety of components may be connected through the input/output device interfaces (602/702), as will be discussed further below. Additionally, each device (110/220/425) may include an address/data bus (624/724) for conveying data among components of the respective device. Each component within a device (110/220/425) may also be directly connected to other components in addition to (or instead of) being connected to other components across the bus (624/724).

Referring to FIG. 6, the device 110 may include input/output device interfaces 602 that connect to a variety of components such as an audio output component such as a speaker 612, a wired headset or a wireless headset (not illustrated), or other component capable of outputting audio. The device 110 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 616 for displaying content. The device 110 may further include a camera 618.

Via antenna(s) 622, the input/output device interfaces 602 may connect to one or more networks 299 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 299, the system may be distributed across a networked environment. The I/O device interface (602/702) may also include communication components that allow data to be exchanged between devices such as different physical servers in a collection of servers or other components.

The components of the device(s) 110, the natural language command processing system component(s) 220, or a skill system 425 may include their own dedicated processors, memory, and/or storage. Alternatively, one or more of the components of the device(s) 110, the natural language command processing system component(s) 220, or a skill system 425 may utilize the I/O interfaces (602/702), processor(s) (604/704), memory (606/706), and/or storage (608/708) of the device(s) 110, natural language command processing system component(s) 220, or the skill system 425, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system component(s) 220, and a skill system 425, as described herein, are illustrative, and may be located as a stand-alone device or may be included, in whole or in part, as a component of a larger device or system. As can be appreciated, a number of components may exist either on a system component(s) 220 and/or on device 110. For example, language processing 492/592 (which may include ASR 250/550), etc., for example as illustrated in FIGS. 4 and 5. Unless expressly noted otherwise, the system version of such components may operate similarly to the device version of such components and thus the description of one version (e.g., the system version or the local version) applies to the description of the other version (e.g., the local version or system version) and vice-versa.

Figure 8:
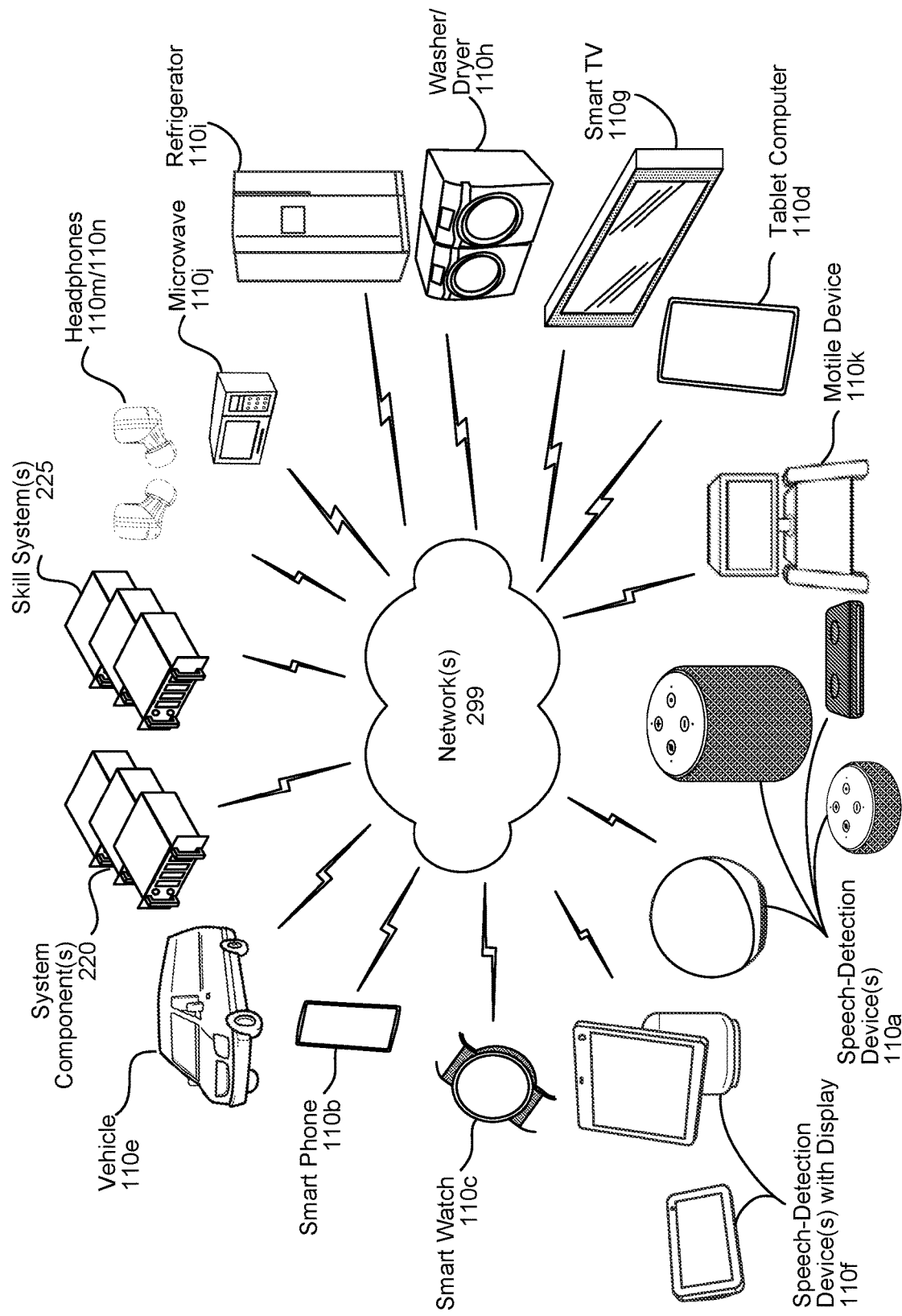
FIG. 8 illustrates an example of a computer network for use with the overall system, according to embodiments of the present disclosure.

As illustrated in FIG. 8, multiple devices (110a-110n, 220, 425) may contain components of the system and the devices may be connected over a network(s) 299. The network(s) 299 may include a local or private network or may include a wide network such as the Internet. Devices may be connected to the network(s) 299 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile device 110k (e.g., a robot), etc., may be connected to the network(s) 299 through a wireless service provider, over a Wi-Fi or cellular network connection, or the like. Other devices are included as network-connected support devices, such as the natural language command processing system component(s) 220, the skill system(s) 425, and/or others. The support devices may connect to the network(s) 299 through a wired connection or wireless connection. Networked devices may capture audio using one-or-more built-in or connected microphones or other audio capture devices, with processing performed by ASR components, NLU components, or other components of the same device or another device connected via the network(s) 299, such as the ASR component 250, the NLU component 260, etc. of the natural language command processing system component(s) 220.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
    receiving, from a first device, input audio data including a spoken natural language user input associated with a user profile;
    processing the input audio data to determine NLU output data indicating an intent of the spoken natural language user input;

determining a skill component configured to generate a response to the spoken natural language user input based on the NLU output data;
determining skill configuration data associated with the skill component, the skill configuration data indicating at least one display capability for outputting first visual content of the skill component;
determining a plurality of devices associated with the user profile, the plurality of devices comprising a second device and a third device;
determining first device context data for the second device, the first device context data indicating a first display capability and a first location of the second device;
determining second device context data for the third device, the second device context data indicating a second display capability and a second location of the third device;
determining, based on the at least one display capability indicated in the skill configuration data, the first device context data, and the second device context data, that the second device is usable to present the first visual content of the skill component;
sending the NLU output data to the skill component;
based on determining the second device is usable to present the first visual content of the skill component, sending an indication of the first display capability of the second device to the skill component;
receiving, from the skill component and in response to sending the NLU output data and the indication:
  a first portion of the response to the spoken natural language user input, wherein the first portion of the response to the spoken natural language user input is is to be output as audio; and
  a second portion of the response to the spoken natural language user input, wherein the second portion of the response to the spoken natural language user input is to be output using a display;
causing the first device to present the audio corresponding to the first portion of the response to the spoken natural language user input, and
causing the second device to present the first visual content corresponding to the second portion of the response to the spoken natural language user input.

2. The computer-implemented method of claim 1, further comprising:
determining a dialog, including the spoken natural language user input, has ended;
after determining the dialog has ended, determining supplemental content that is related to the dialog, the supplemental content including second visual content; and
causing the second device to present the second visual content.

3. The computer-implemented method of claim 2, further comprising:
after determining the dialog has ended, determining:
  the first device context data;
  the second device context data; and
  based on the first device context data and the second device context data, that the second device is usable to present second visual content included in the supplemental content.

4. The computer-implemented method of claim 1, further comprising:
determining the first device context data after receiving the input audio data;
processing the input audio data to further determine the first location is indicated in the spoken natural language user input;
generating third device context data corresponding to the first device context data updated to indicate the first location is indicated in the spoken natural language user input; and
based on the third device context data instead of the first device context data, determining the second device is usable to present the first visual content of the skill component.

5. A computer-implemented method, comprising:
receiving, from a first device, first input data representing a first user input;
processing the first input data to determine a first intent of the first user input;
determining a first skill component configured to generate a first response to the first user input based on the first intent;
determining first skill configuration data associated with the first skill component, the first skill configuration data indicating at least one display capability for outputting first visual content of the first skill component;
determining, based on the first skill configuration data associated with the first skill component, a second device usable to present the first visual content of the first skill component;
sending the first intent to the first skill component;
receiving, from the first skill component and in response to sending the first intent:
  a first portion of the first response to be output using at least one speaker; and
  a second portion of the first response to be output using a display;
causing the first device to present the first portion of the first response; and
causing the second device to present the second portion of the first response.

6. The computer-implemented method of claim 5, further comprising:
determining supplemental content corresponding to the first user input is to be output, the supplemental content including second visual content; and
causing the second device to present the second visual content.

7. The computer-implemented method of claim 6, further comprising:
determining configuration data associated with a provider of the supplemental content, the configuration data indicating at least one display capability for outputting the second visual content; and
determining, based on the configuration data associated with the provider of the supplemental content, that the second device is usable to present the second visual content of the supplemental content.

8. The computer-implemented method of claim 5, further comprising:
after receiving the first input data, determining first device context data corresponding to the second device, the first device context data indicating a first location of the second device;
processing the first input data to further determine the first location is indicated in the first user input;
generating second device context data corresponding to the first device context data updated to indicate the first location is indicated in the first user input; and based on the second device context data instead of the first device context data, determining the second device usable to present the first visual content of the first skill component.

9. The computer-implemented method of claim 5, further comprising:
after determining the second device, sending an indication of the second device to the first skill component.

10. The computer-implemented method of claim 5, wherein determining the second device is to be used to present visual content responsive to the first user input comprises one or more of:
determining the second device is within a same room as the first device;
determining a display capability of the second device satisfies a criterion;
determining the second device is not associated with a do not disturb status; and
determining the second device is associated with an online status.

11. The computer-implemented method of claim 5, further comprising:
receiving, from the first device, second input data representing a second user input;
processing the second input data to determine a second intent of the second user input;
determining a second skill component configured to generate a second response to the second user input based on the second intent;
determining second skill configuration data associated with the second skill component, the second skill configuration data indicating:
at least one display capability for outputting second visual content of the second skill component; and
at least one audio capability for outputting audio of the second skill component;
determining, based on the second skill configuration data associated with the second skill component, that the second device is usable to present the second visual content and the audio of the second skill component;
sending the second intent to the second skill component;
receiving, from the second skill component and in response to sending the second intent:
a first portion of the second response to be output using at least one speaker; and
a second portion of the second response to be output using a display;
causing the second device to present the first portion of the second response; and
causing the second device to present the second portion of the second response.

12. The computer-implemented method of claim 5, further comprising:
receiving, from the first device, second input data representing a second user input;
processing the second input data to determine a second intent of the second user input;
determining a second skill component configured to generate a second response to the second user input based on the second intent;
determining second skill configuration data associated with the second skill component, the second skill configuration data indicating:
at least one display capability for outputting second visual content of the second skill component; and
at least one audio capability for outputting audio of the second skill component;
determining, based on the second skill configuration data associated with the second skill component, that the second device is usable to present the second visual content of the second skill component;
determining, based on the second skill configuration data associated with the second skill component, a third device usable to present audio output of the second skill component;
sending the second intent to the second skill component;
receiving, from the second skill component and in response to sending the second intent:
a first portion of the second response to be output using at least one speaker; and
a second portion of the second response to be output using a display;
causing the third device to present the first portion of the second response; and
causing the second device to present the second portion of the second response.

13. A system, comprising:
at least one processor; and
at least one memory comprising instructions that, when executed by the at least one processor, cause the system to:
receive, from a first device, first input data representing a first user input;
process the first input data to determine a first intent of the first user input;
determine a first skill component configured to generate a first response to the first user input based on the first intent;
determine first skill configuration data associated with the first skill component, the first skill configuration data indicating at least one display capability for outputting first visual content of the first skill component;
determine, based on the first skill configuration data associated with the first skill component, a second device usable to present the first visual content of the first skill component;
send the first intent to the first skill component;
receive, from the first skill component and in response to sending the first intent:
a first portion of the first response to be output using at least one speaker; and
a second portion of the first response to be output using a display;
cause the first device to present the first portion of the first response; and
cause the second device to present the second portion of the first response.

14. The system of claim 13, wherein the at least one memory further comprises instructions that, when executed by the at least one processor, further cause the system to:
determine supplemental content corresponding to the first user input is to be output, the supplemental content including second visual content; and
cause the second device to present the second visual content.

15. The system of claim 14, wherein the at least one memory further comprises instructions that, when executed by the at least one processor, further cause the system to:
determine configuration data associated with a provider of the supplemental content, the configuration data indicating at least one display capability for outputting the second visual content; and determine, based on the configuration data associated with the provider of the supplemental content, that the second device is usable to present the second visual content of the supplemental content.

16. The system of claim 13, wherein the at least one memory further comprises instructions that, when executed by the at least one processor, further cause the system to:
    after receiving the first input data, determine first device context data corresponding to the second device, the first device context data indicating a first location of the second device;
    process the first input data to further determine the first location is indicated in the first user input;
    generate second device context data corresponding to the first device context data updated to indicate the first location is indicated in the first user input; and
    based on the second device context data instead of the first device context data, determine the second device usable to present the first visual content of the first skill component.

17. The system of claim 13, wherein the at least one memory further comprises instructions that, when executed by the at least one processor, further cause the system to:
    after determining the second device, send an indication of the second device to the first skill component.

18. The system of claim 13, wherein the instructions causing the system to determine the second device is to be used to present visual content responsive to the first user input further comprise instructions for determining one or more of:
    the second device is within a same room as the first device;
    a display capability of the second device satisfies a criterion;
    the second device is not associated with a do not disturb status; and
    the second device is associated with an online status.

19. The system of claim 13, wherein the at least one memory further comprises instructions that, when executed by the at least one processor, further cause the system to:
    receive, from the first device, second input data representing a second user input;
    process the second input data to determine a second intent of the second user input;
    determine a second skill component configured to generate a second response to the second user input based on the second intent;
    determine second skill configuration data associated with the second skill component, the second skill configuration data indicating:
        at least one display capability for outputting second visual content of the second skill component; and
        at least one audio capability for outputting audio of the second skill component;
    determine, based on the second skill configuration data associated with the second skill component, that the second device is usable to present the second visual content and the audio of the second skill component;
    send the second intent to the second skill component;
    receive, from the second skill component and in response to sending the second intent:
        a first portion of the second response to be output using at least one speaker; and
        a second portion of the second response to be output using a display;
    cause the second device to present the first portion of the second response; and
    cause the second device to present the second portion of the second response.

20. The system of claim 13, wherein the at least one memory further comprises instructions that, when executed by the at least one processor, further cause the system to:
    receive, from the first device, second input data representing a second user input;
    process the second input data to determine a second intent of the second user input;
    determine a second skill component configured to generate a second response to the second user input based on the second intent;
    determine second skill configuration data associated with the second skill component, the second skill configuration data indicating:
        at least one display capability for outputting second visual content of the second skill component; and
        at least one audio capability for outputting audio of the second skill component;
    determine, based on the second skill configuration data associated with the second skill component, that the second device is usable to present the second visual content of the second skill component;
    determine, based on the second skill configuration data associated with the second skill component, a third device usable to present audio output of the second skill component;
    send the second intent to the second skill component;
    receive, from the second skill component and in response to sending the second intent:
        a first portion of the second response to be output using at least one speaker; and
        a second portion of the second response to be output using a display;
    cause the third device to present the first portion of the second response; and
    cause the second device to present the second portion of the second response.

* * * * *